United States Patent
Tanabe

(10) Patent No.: US 11,516,372 B2
(45) Date of Patent: Nov. 29, 2022

(54) IMAGE CAPTURING APPARATUS, INFORMATION PROCESSING APPARATUS, METHODS FOR CONTROLLING THE SAME, IMAGE CAPTURING APPARATUS SYSTEM, AND STORAGE MEDIUM

(71) Applicant: CANON KABUSHIKI KAISHA, Tokyo (JP)

(72) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 17/083,867

(22) Filed: Oct. 29, 2020

(65) Prior Publication Data
US 2021/0136258 A1    May 6, 2021

(30) Foreign Application Priority Data
Nov. 1, 2019    (JP) .............................. JP2019-200225

(51) Int. Cl.
*H04N 5/217*    (2011.01)
*G06N 3/08*    (2006.01)
*H04N 5/765*    (2006.01)
*H04N 9/73*    (2006.01)

(52) U.S. Cl.
CPC ............. *H04N 5/2178* (2013.01); *G06N 3/08* (2013.01); *H04N 5/765* (2013.01); *H04N 9/73* (2013.01)

(58) Field of Classification Search
CPC .................................................. H04N 5/2178

USPC ......................................................... 348/241
See application file for complete search history.

(56) References Cited

U.S. PATENT DOCUMENTS

| | | | |
|---|---|---|---|
| 2008/0199056 A1 | 8/2008 | Tokuse | |
| 2009/0244608 A1 | 10/2009 | Tsuji | |
| 2019/0080171 A1* | 3/2019 | Zheng | ..................... G06T 11/60 |
| 2019/0147360 A1* | 5/2019 | Matsumoto | .......... G06K 9/6262 |
| | | | 709/203 |
| 2019/0213443 A1* | 7/2019 | Cunningham | ....... G06K 9/6256 |

FOREIGN PATENT DOCUMENTS

JP    2008-067316 A    3/2008

OTHER PUBLICATIONS

The above patent documents were cited in a European Search Report dated Mar. 3, 2021, which is enclosed, that issued in the corresponding European Patent Application No. 20201949.3.

\* cited by examiner

*Primary Examiner* — Joel W Fosselman
(74) *Attorney, Agent, or Firm* — Cowan, Liebowitz & Latman, P.C.

(57) ABSTRACT

An image capturing apparatus includes a reception unit configured to connect with an external device, which is able to transmit a plurality of learned models, and receive list information of a plurality of learned models, a selection unit configured to select, based on the list information of the plurality of learned models, a learned model from the plurality of learned models, and a transmission unit configured to transmit a transmission request for the learned model selected by the selection unit to the external device, wherein, the reception unit receives the selected learned model transmitted from the external device.

26 Claims, 15 Drawing Sheets

F I G. 1
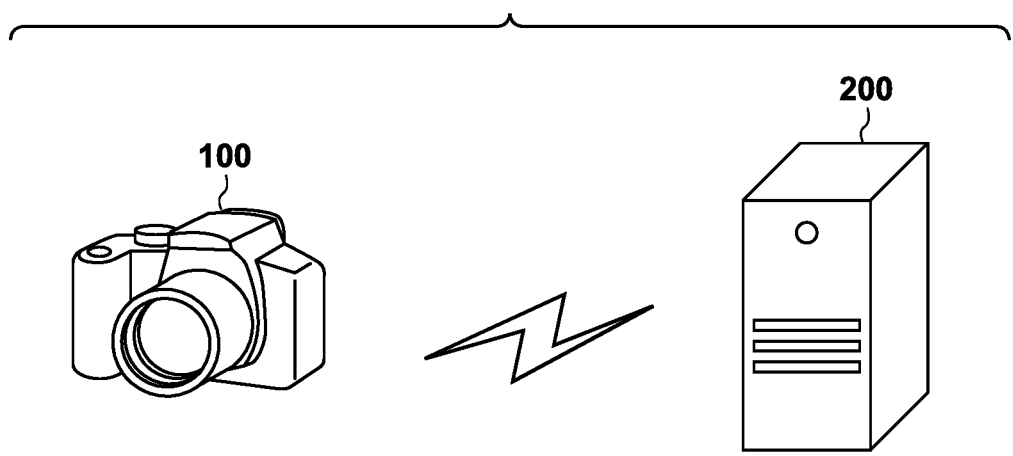

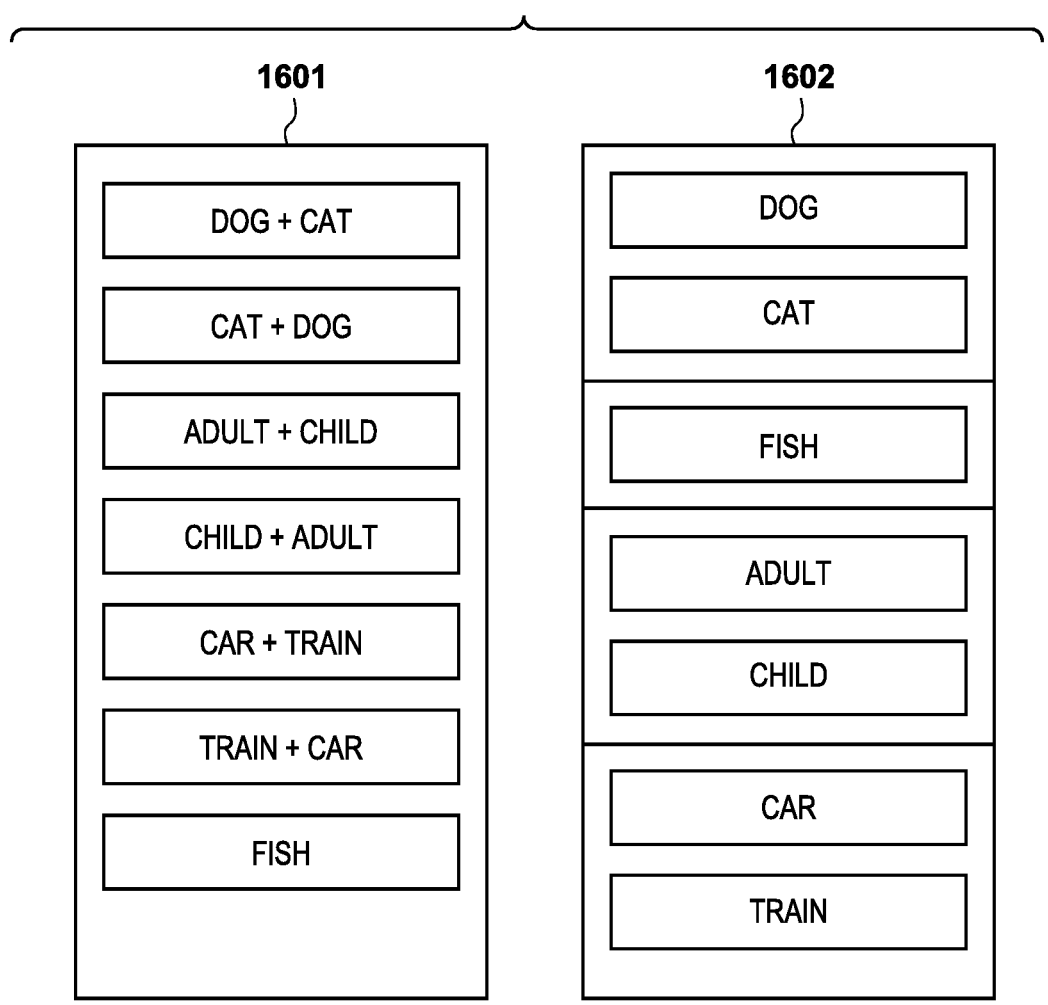
F I G. 16

IMAGE CAPTURING APPARATUS, INFORMATION PROCESSING APPARATUS, METHODS FOR CONTROLLING THE SAME, IMAGE CAPTURING APPARATUS SYSTEM, AND STORAGE MEDIUM

BACKGROUND OF THE INVENTION

Field of the Invention

The present invention relates to an image capturing apparatus, an information processing apparatus, and an image capturing apparatus system.

Description of the Related Art

Image capturing apparatuses that, when capturing, identify subjects by a machine learning method as typified by a neural network and such are known. Such image capturing apparatuses use learned models that support specific subjects preassigned by a user in order to perform processing in relation to the specific subjects.

Although currently, there are several types of subjects such as people, cars, and trains, the types of subjects are expected to increase in number in the future. Furthermore, although conventionally used for subject determination in AF (autofocus processing), it is considered that the scope of usage will widen in relation to processing in the image capturing apparatuses such as AE (auto exposure), AWB (auto white balance), image processing, and noise removal.

In such a case, although a plurality of learned models would become necessary, it would be difficult, in practice, to hold all the learned models on an image capturing apparatus because that would necessitate a large recording capacity. Thus, it is necessary to appropriately switch the learned models that can be held in the image capturing apparatus.

In Japanese Patent Laid-Open No. 2008-67316, an image distribution system, which generates and then distributes to a client terminal a high-resolution image whose image quality was controlled in accordance with a setting parameter for a high-resolution image of a desired image requested from the client terminal, is disclosed.

However, although in Japanese Patent Laid-Open No. 2008-67316, a method for generating and transmitting a high-resolution image in accordance with a request from a client terminal is disclosed, there is no disclosure related to an exchange of learned models in neural networks.

SUMMARY OF THE INVENTION

The present invention is made in view of the problems described above and makes it possible, in shooting, to appropriately provide an image capturing apparatus with a learned model used for determining a subject and such.

According to a first aspect of the present invention, there is provided an image capturing apparatus, comprising: at least one processor or circuit configured to function as: a reception unit configured to connect with an external device which is able to transmit a plurality of learned models and receive list information of a plurality of learned models; a selection unit configured to select, based on the list information of the plurality of learned models, a learned model from the plurality of learned models; and a transmission unit configured to transmit to the external device a transmission request for the learned model selected by the selection unit, wherein, the reception unit receives the selected learned model transmitted from the external device.

According to a second aspect of the present invention, there is provided an information processing apparatus, comprising: at least one processor or circuit configured to function as: a reception unit configured to connect with an external device which is able to transmit a plurality of learned models and receive list information of a plurality of learned model; a selection unit configured to select, based on the list information of the plurality of learned models, a learned model from the plurality of learned models; and a transmission unit configured to transmit to the external device a transmission request for the learned model selected by the selection unit, wherein the reception unit receives the selected learned model transmitted from the external device, and the transmission unit transmits the selected learned model to an image capturing apparatus.

According to a third aspect of the present invention, there is provided an image capturing apparatus system comprising: an external device configured to be able to transmit a plurality of learned models; and an image capturing apparatus including at least one processor or circuit configured to function as a reception unit configured to connect with the external device and receive list information of a plurality of learned models, a selection unit configured to select, based on the list information of the plurality of learned models, a learned model from the plurality of learned models, and a transmission unit configured to transmit a transmission request for the learned model selected by the selection unit to the external device, wherein, the reception unit receives the selected learned model transmitted from the external device.

According to a fourth aspect of the present invention, there is provided an image capturing apparatus system comprising: an external device configured to be able to transmit a plurality of learned models; an information processing apparatus including at least one processor or circuit configured to function as a reception unit configured to connect with the external device and receive list information of a plurality of learned models, a selection unit configured to select, based on the list information of the plurality of learned models, a learned model from the plurality of learned models, and a transmission unit configured to transmit a transmission request for the learned model selected by the selection unit to the external device; and an image capturing apparatus, wherein the reception unit receives the selected learned model transmitted from the external device, and the transmission unit transmits the selected learned model to the image capturing apparatus.

According to a fifth aspect of the present invention, there is provided a method of controlling an image capturing apparatus comprising: connecting with an external device, which is able to transmit a plurality of learned models, and receiving list information of a plurality of learned models; selecting, based on the list information of the plurality of learned models, a learned model from the plurality of learned models; and transmitting to the external device a transmission request for the learned model selected in the selection, wherein, in the reception, the selected learned model transmitted from the external device is received.

According to a sixth aspect of the present invention, there is provided a method of controlling an information processing apparatus comprising: connecting with an external device, which is able to transmit a plurality of learned models, and receiving list information of a plurality of learned models; selecting, based on the list information of the plurality of learned models, a learned model from the plurality of learned models; and transmitting to the external device a transmission request for the learned model selected in the selection, wherein in the reception, the selected learned model transmitted from the external device is received, and in the transmission, the selected learned model is transmitted to an image capturing apparatus.

Further features of the present invention will become apparent from the following description of exemplary embodiments with reference to the attached drawings.

BRIEF DESCRIPTION OF THE DRAWINGS

FIG. 1 is a system configuration diagram of a first embodiment.

FIG. 13 is a diagram illustrating an example of a menu selection screen of the information processing apparatus in the second embodiment.

FIG. 16 is a diagram illustrating an example of a learning model in a third embodiment.

DESCRIPTION OF THE EMBODIMENTS

Figure 2:
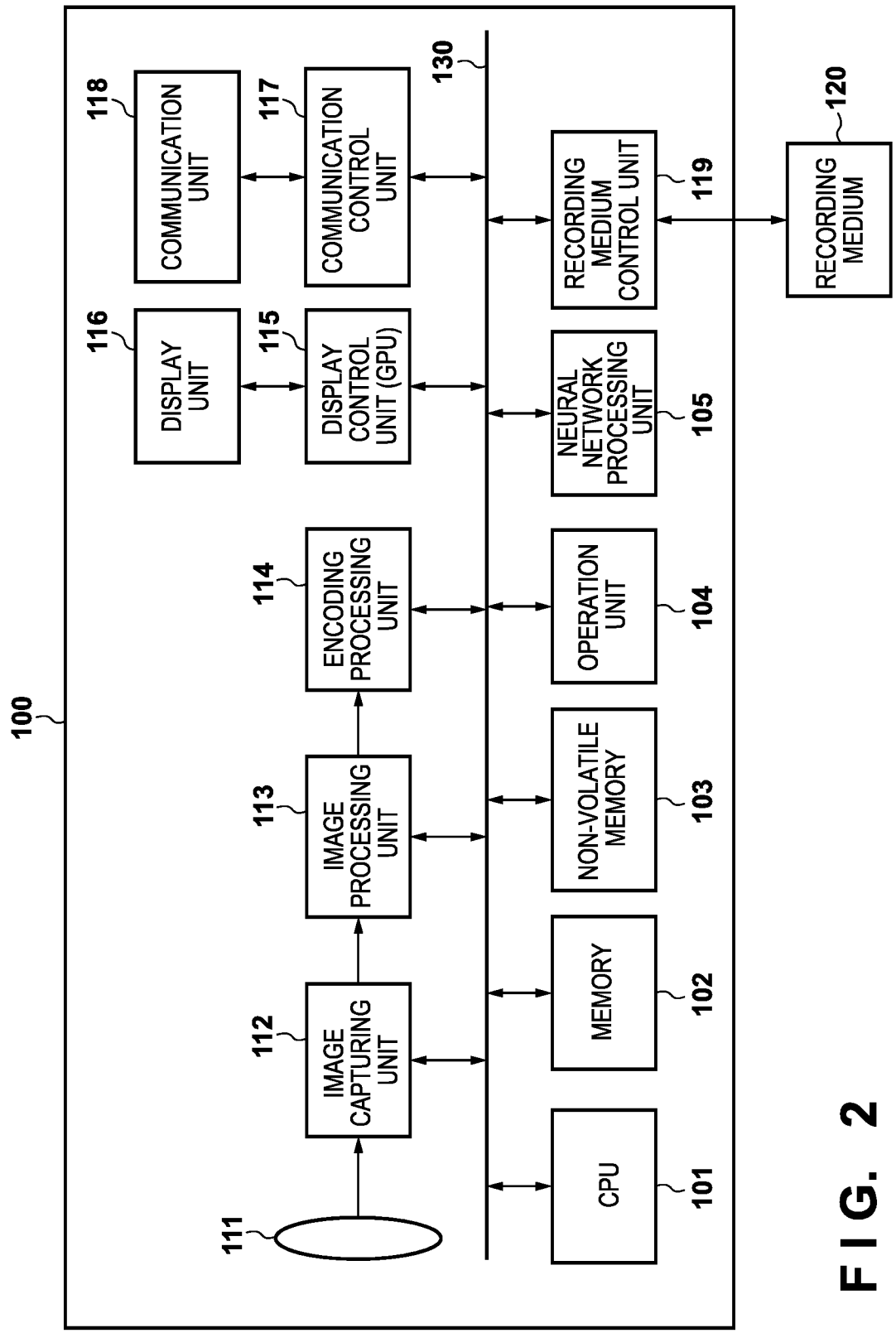
FIG. 2 is a block diagram of an image capturing apparatus in the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

<System Configuration>

FIG. 1 is a diagram illustrating a configuration of an image capturing apparatus system in a first embodiment. The image capturing apparatus system is configured by an image capturing apparatus 100 and a communication apparatus 200 that is able to transmit a plurality of learned models connected by a wireless or wired communication network. The image capturing apparatus 100 uses a learned model in order to perform any processing of detection processing, classification processing, region classification processing, image restoration processing, focus processing, exposure processing, and white balance processing.

<Configuration of Image Capturing Apparatus 100>

FIG. 2 is a block diagram illustrating a configuration of the image capturing apparatus 100. In FIG. 2, the image capturing apparatus 100 includes a CPU 101, a memory 102, a non-volatile memory 103, an operation unit 104, a neural network processing unit 105, an image capturing unit 112, an image processing unit 113, an encoding processing unit 114, a display control unit 115, and a display unit 116. Furthermore, the image capturing apparatus 100 includes a communication control unit 117, a communication unit 118, a recording medium control unit 119, and an internal bus 130.

Although the image capturing apparatus 100 uses a photographic lens 111 in order to form an optical image of a subject in a pixel array of the image capturing unit 112, the photographic lens 111 may or may not be able to attach/detach to/from a body (a casing or a main body) of the image capturing apparatus 100. Also, the image capturing apparatus 100 performs in relation to a recording medium 120 writing and reading of image data via the recording medium control unit 119. The recording medium 120 may or may not be able to attach/detach to/from the image capturing apparatus 100.

The CPU 101, by executing a computer program stored in the non-volatile memory 103, controls the operation of each unit (each functional block) of the image capturing apparatus 100 via the internal bus 130.

The memory 102 is a rewritable volatile memory. The memory 102 temporarily records a computer program for controlling the operation of each unit of the image capturing apparatus 100, information such as a parameter related to the operation of each unit of the image capturing apparatus 100, and information and such received by the communication control unit 117. Also, the memory 102 temporarily records an image acquired by the image capturing unit 112 and an image and information processed by the image processing unit 113, the encoding processing unit 114, and such. The memory 102 comprises enough memory capacity for temporarily recording these.

Furthermore, the memory 102 stores a computer program that describes the processing content of a neural network configuration and learned coefficient parameters such as a weighting coefficient and a bias value (bias information) which are used by the neural network processing unit 105. Note that the weighting coefficient is a value that indicates an internode connection strength of a neural network and the bias is a value for providing an offset in relation to an accumulated value of the weighting coefficient and input data.

The non-volatile memory 103 is a memory that is able to be electrically cleared and recorded and for example, an EEPROM, a hard disk, or such are used. The non-volatile memory 103 stores a computer program for controlling the operation of each unit of the image capturing apparatus 100 and information such as a parameter related to the operation of each unit of the image capturing apparatus 100. This computer program achieves each type of an operation that is performed by the image capturing apparatus 100. Note that in the non-volatile memory 103, a computer program that describes the processing content of a neural network and learned coefficient parameters such as a weighting coefficient and a bias value which are used by the neural network processing unit 105 described above, may be stored.

The operation unit 104 provides a user interface for operating the image capturing apparatus 100. The operation unit 104 includes each type of a button such as a power button, a menu button, a release button for shooting, a video recording button, and a cancel button, and each type of a button is configured by a switch, a touch panel, or such. The CPU 101 controls the image capturing apparatus 100 in accordance with a user instruction inputted via the operation unit 104. Note that although an example in a case where the CPU 101 controls the image capturing apparatus 100 based on an operation inputted via the operation unit 104 is described here, no limitation is made to this. For example, the CPU 101 may control the image capturing apparatus 100 based on a request inputted via the communication unit 118 from a remote controller (not illustrated), a mobile terminal (not illustrated), or such. The neural network processing unit 105 is described later using FIG. 3.

The photographic lens (a lens unit) 111 is configured by a lens group (not illustrated) including a zoom lens, a focus lens, and such; a lens control unit (not illustrated); a diaphragm (not illustrated); and such. The photographic lens 111 may function as a zoom means for changing an angle of view. The lens control unit performs focus adjustment and control of an aperture value (an F value) with a control signal transmitted from the CPU 101.

The image capturing unit 112 may function as an acquiring means for successively acquiring a plurality of images configuring a moving image. An area image sensor consisting of, for example, a CCD (a charge-coupled device), a CMOS (a complementary metal-oxide semiconductor) element or such is used as the image capturing unit 112. The image capturing unit 112 includes a pixel array (not illustrated) in which a photoelectric conversion unit (not illustrated) for converting an optical image of a subject to an electrical signal is arranged in an array, namely, two-dimensionally. On this pixel array, an optical image of a subject is formed by the photographic lens 111. The image capturing unit 112 outputs the captured image to the image processing unit 113 or the memory 102. Note that the image capturing unit 112 is also able to acquire a still image.

The image processing unit 113 performs predetermined image processing in relation to image data outputted from the image capturing unit 112 or image data read out from the memory 102. As examples of this image processing, dynamic range conversion processing, interpolation processing, reduction processing (resize processing), color conversion processing, and such can be given. Also, the image processing unit 113 uses the image data acquired by the image capturing unit 112 in order to perform predetermined calculation processing for exposure control, focus detection control, and such. Based on a calculation result acquired from calculation processing by the image processing unit 113, exposure control, focus detection control, and such are performed by the CPU 101. More specifically, AE processing, AWB processing, AF processing, and such are performed by the CPU 101. Also, a part of the AE processing, the AWB processing, and the AF processing may be performed using the neural network processing unit 105.

The encoding processing unit 114, by performing intra-frame prediction encoding (intra-screen prediction encoding), inter-frame prediction encoding (inter-screen prediction encoding), and such in relation to image data, compresses the size of the image data. The encoding processing unit 114 is, for example, an encoding apparatus configured by a semiconductor element or such. The encoding processing unit 114 may be an encoding apparatus arranged on the outside of the image capturing apparatus 100. Also, a part of the processing of the encoding processing unit 114 may be performed using the neural network processing unit 105.

The display control unit 115 controls the display unit 116. The display unit 116 comprises a display screen (not illustrated). The display control unit 115 generates an image that is able to be displayed on the display screen of the display unit 116 and then outputs that image, namely, an image signal, to the display unit 116. Also, the display control unit 115 not only outputs the image data to the display unit 116 but also is able to output the image data to an external device via the communication control unit 117. The display unit 116, based on the image signal transmitted from the display control unit 115, displays an image on the display screen. The display unit 116 comprises an OSD (On Screen Display) function, which is a function for displaying a setting screen of a menu and such on the display screen. The display control unit 115 may superimpose an OSD image on the image signal and then output the image signal to the display unit 116. The display unit 116 is configured by a liquid crystal display, an organic electroluminescence display, or such and displays the image signal transmitted from the display control unit 115. The display unit 116 may be, for example, a touch panel. The display unit 116, in a case where the display unit 116 is a touch panel, may also function as the operation unit 104.

The communication control unit 117 is controlled by the CPU 101. The communication control unit 117 is configured to generate a modulation signal compatible with a wireless communication standard such as IEEE 802.11, output that modulated signal to the communication unit 118, and then receive a modulation signal from an external device via the communication unit 118. Also, the communication control unit 117 is able to transmit and receive a control signal and a video signal. For example, the communication control unit 117 may also control the communication unit 118 in order to transmit a video signal complying with communication standards such as an HDMI (High Definition Multimedia Interface) and an SDI (Serial Digital Interface).

The communication unit 118 converts the video signal and the control signal into physical electrical signals which then are transmitted and received to and from the external device. Note that although an example in a case where the video signal and the control signal are communicated by the communication unit 118 is described here, no limitation is made to the communication performed by the communication unit 118.

The recording medium control unit 119 controls the recording medium 120. The recording medium control unit 119, based on a request from the CPU 101, outputs to the recording medium 120 a control signal for controlling the recording medium 120. A non-volatile memory, a magnetic disk, or such are used as the recording medium 120, for example. The recording medium 120 may or may not be able to attach/detach as described above. The recording medium 120 records encoded image data and such. The image data and such are saved as a file in a format compatible with a file system of the recording medium 120.

Note that each of the functional blocks 101 to 105, 112 to 115, 117, and 119 are connected so as to be accessible to each other via the internal bus 130.

<Configuration of Neural Network Processing Unit 105>

Figure 3:
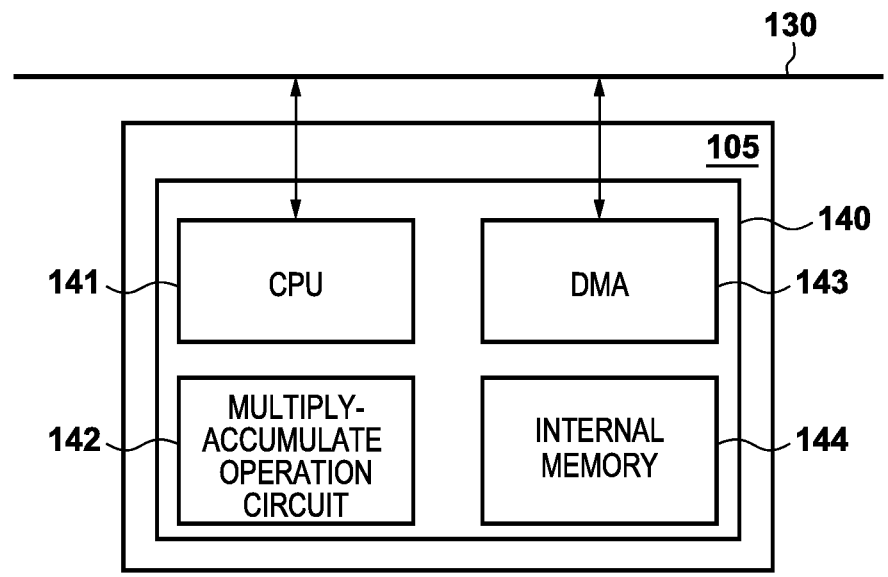
FIG. 3 is a schematic configuration diagram of a neural network processing unit in the first embodiment.

FIG. 3 is a diagram illustrating a configuration of the neural network processing unit 105. The neural network processing unit 105 executes neural network processing using a prelearned coefficient parameter. Note that although the neural network processing is something that is configured by, for example, a CNN (Convolutional Neural Network) and a fully-connected layer, no limitation is made to this. Also, the coefficient parameter described above corresponds, in the fully-connected layer, to a weight or a bias held by each edge connecting to and from nodes of each layer and, in the CNN, to a weight or a bias of a kernel.

As illustrated in FIG. 3, the neural network processing unit 105 is configured by including a CPU 141, a multiply-accumulate operation circuit 142, a DMA 143, and an internal memory 144 in a neural core 140.

The CPU 141, via the internal bus 130, executes a computer program stored in the memory 102, the non-volatile memory 103, or the internal memory 144 on which processing content of a neural network is described. Also, the CPU 141 performs control of the multiply-accumulate operation circuit 142 and the DMA 143.

The multiply-accumulate operation circuit 142 is a circuit that performs a multiply-accumulate operation in the neural network. The multiply-accumulate operation circuit 142 includes a plurality of multiply-accumulate operation circuits and is able to execute processing in parallel.

The DMA 143 is a circuit specialized in performing a data transfer without going through the CPU 141 and performs a data transfer between the memory 102 or the non-volatile memory 103 and the internal memory 144 via the internal bus 130. Also, the DMA 143 performs a data transfer between the multiply-accumulate operation circuit 142 and the internal memory 144. Data transferred by the DMA 143 is a computer program describing the processing content of the neural network, the learned coefficient parameter, intermediate data calculated in the multiply-accumulate operation circuit 142, and such.

The internal memory 144 stores a computer program describing the processing content of the neural network, the learned coefficient parameter, intermediate data calculated in the multiply-accumulate operation circuit 142, and such. Also, the internal memory 144 may include a plurality of banks and may switch the banks dynamically.

<Configuration of Communication Apparatus 200>

Figure 4:
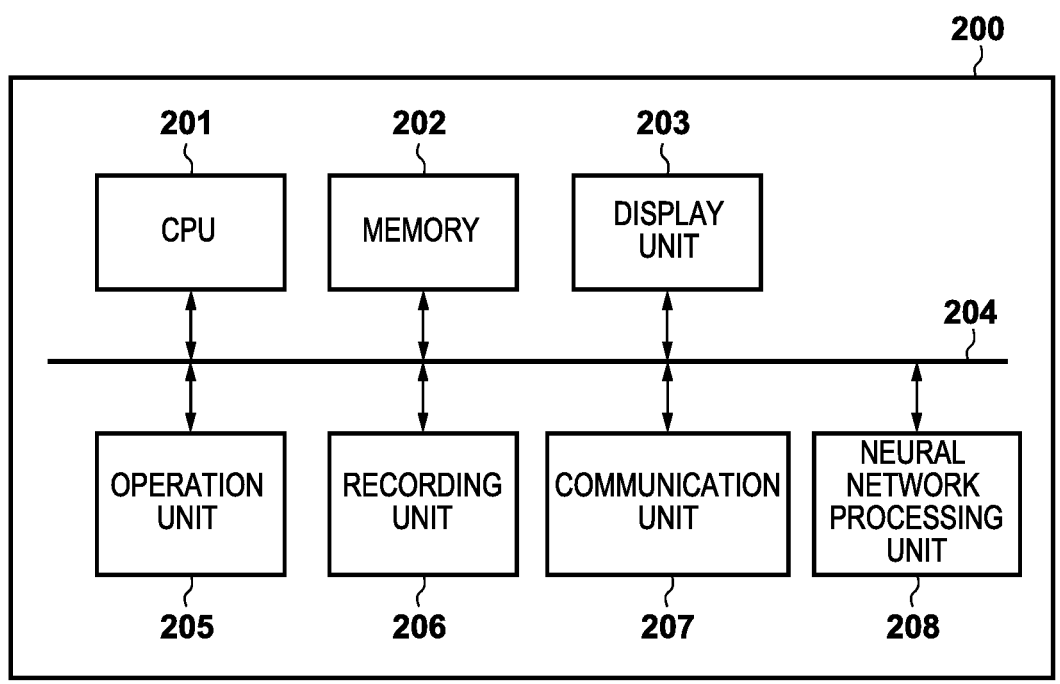
FIG. 4 is a block diagram of a communication apparatus in the first embodiment.

FIG. 4 is a block diagram illustrating a configuration of the communication apparatus 200 in the first embodiment of the present invention.

In FIG. 4, a CPU 201 performs control of all processing blocks configuring the communication apparatus 200. A memory 202 is a memory used mainly as a work area for the CPU 201 and a temporary buffer area for data. A display unit 203 is configured by a liquid crystal panel, an organic EL panel, or such and performs display of an operation screen and such based on an instruction from the CPU 201. An internal bus 204 is a bus for connecting each processing block in the communication apparatus 200 to each other.

An operation unit 205 is configured by a keyboard, a mouse, a button, a touch panel, a remote controller, and such and receives an operation instruction from the user. Operation information inputted from the operation unit 205 is transmitted to the CPU 201, and the CPU 201 executes control of each processing block based on the operation information.

A recording unit 206 comprises a recording medium and is a processing block for storing and reading various data to the recording medium based on an instruction from the CPU 201. The recording medium is configured, for example, by an EEPROM, a built-in flash memory, a built-in hard disk, a memory card that is able to attach/detach, or such. Input data and supervised data which are learning data in the neural network, are saved in the recording unit 206.

A communication unit 207 comprises hardware and such for performing wireless LAN and wired LAN communication. In a wireless LAN, it is an IEEE 802.11n/a/g/b method processing block, for example. The communication unit 207 connects to an external access point by the wireless LAN and then performs communication with other wireless communication devices through the access point. Also, the communication unit 207, in a wired LAN, performs communication via an external router by an Ethernet cable or a switching hub. The communication unit 207 performs communication with external devices including the image capturing apparatus 100 and performs exchange of information such as an image, control data, learning data, and a learned model.

A neural network processing unit 208 performs neural network learning processing using the learning data saved in the recording unit 206 and a pregenerated neural network model. The neural network processing unit 208 performs the learning processing in conjunction with an instruction from the user via the operation unit 205 or a receiving of image data received from the communication unit 207 and then recorded in the recording unit 206. The neural network processing unit 208 is configured by a GPU (Graphic Processing Unit) or a DSP (Digital Signal Processor). Note that the neural network learning processing may be performed by the CPU 201 without arranging the neural network processing unit 208.

<Processing Sequence of First Embodiment>

Figure 5:
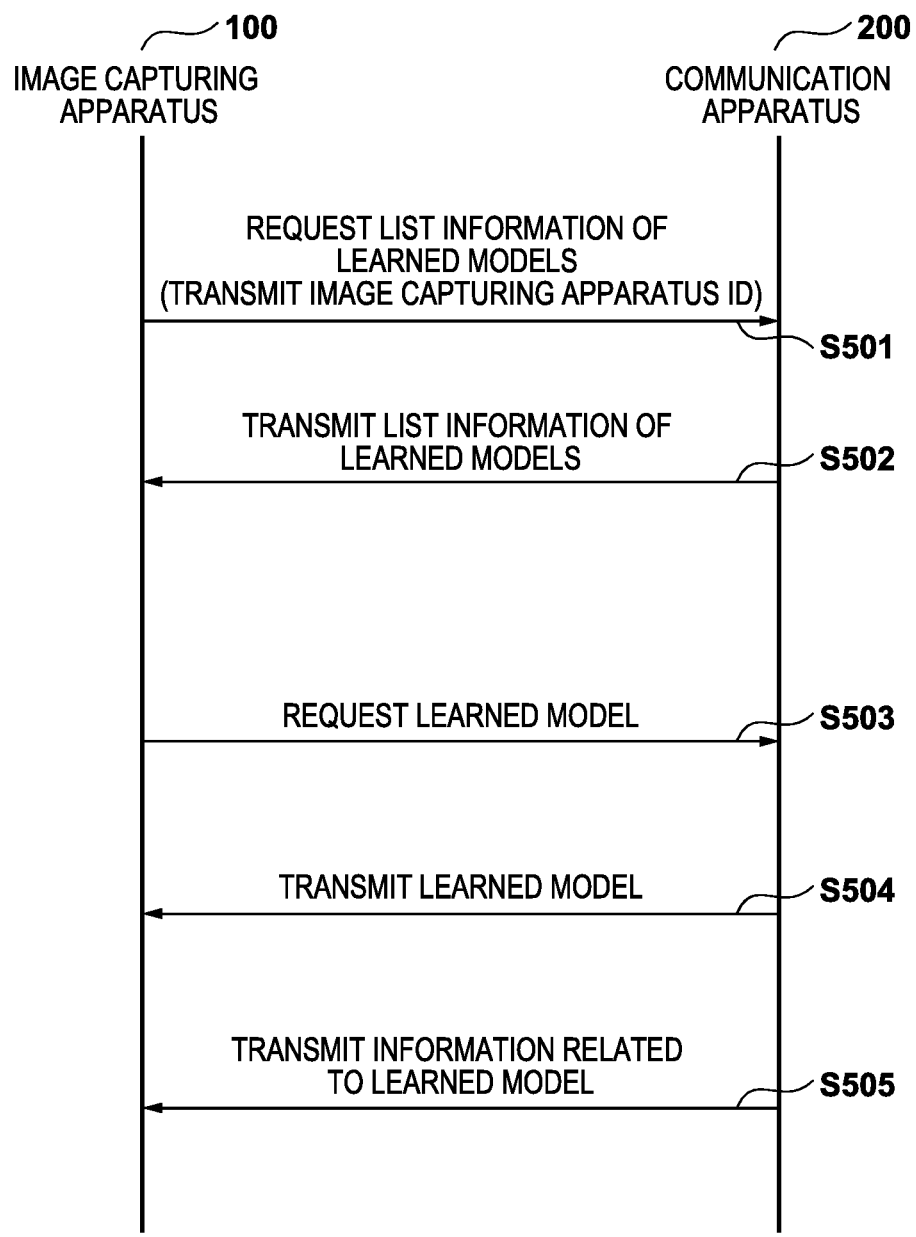
FIG. 5 is a processing sequence diagram of the image capturing apparatus and the communication apparatus in the first embodiment.

Using FIG. 5, processing sequences of the image capturing apparatus 100 and the communication apparatus 200 in the present embodiment are described.

In step S501, the image capturing apparatus 100 transmits an acquisition request (a transmission request) for list information of learned models in relation to the communication apparatus 200. Note that the CPU 101, when transmitting a request for acquiring list information of learned models, adds information (ID) for identifying the image capturing apparatus 100 or information such as a model identification number and a serial number.

In step S502, the communication apparatus 200 receives from the image capturing apparatus 100 the request for acquiring list information of learned models and then replies with list information of learned models. Note that in this step, configuration may be taken so that only list information of learned models configured by learned models that are able to be processed by the image capturing apparatus 100 is transmitted, and configuration may be taken so that list information of all learned models held by the communication apparatus 200 is transmitted. Note that learned models may be prelearned by another device or learned by the neural network processing unit 208 of the communication apparatus 200.

In step S503, the image capturing apparatus 100 selects a necessary learned model from the list information of learned models acquired in step S502 and then transmits an acquisition request for the learned model in relation to the communication apparatus 200.

In step S504, the communication apparatus 200 receives from the image capturing apparatus 100 the acquisition request for the learned model and then replies with the requested learned model.

In step S505, the communication apparatus 200 transmits text, image information, and such necessary for a learned model menu display as information related to the learned model transmitted in step S504.

<Processing Flow of Image Capturing Apparatus 100>

Figure 6:
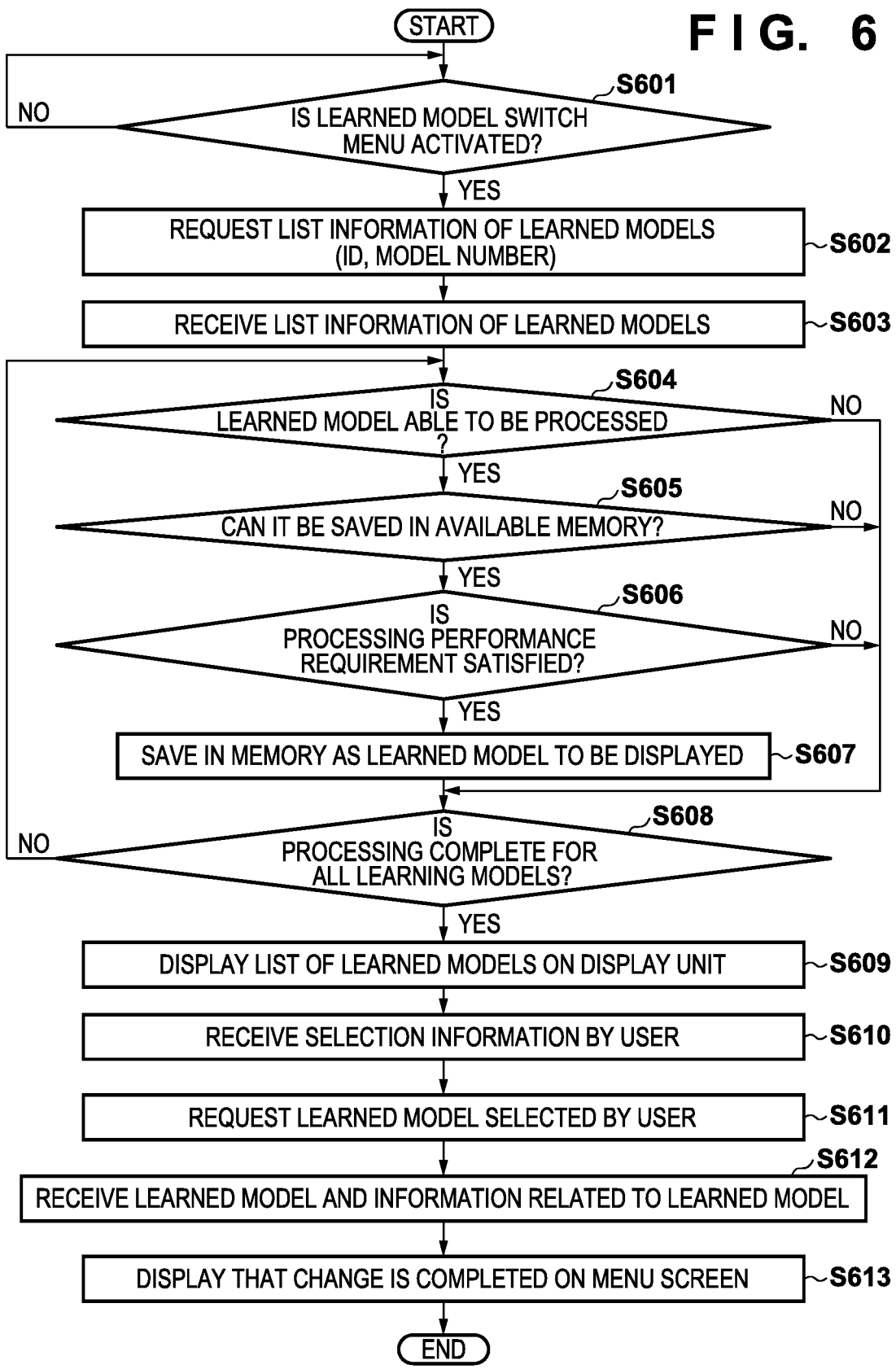
FIG. 6 is a flowchart illustrating processing of the image capturing apparatus in the first embodiment.

Using FIG. 6, processing sequence of the image capturing apparatus 100 in the present embodiment is described. This operation, in a state where the power of the image capturing apparatus 100 is on, is achieved by deploying in the memory 102 the computer program stored in the non-volatile memory 103 and then by the CPU 101 reading and executing the computer program in the memory 102.

In step S601, the CPU 101 determines whether or not there is a display request for a menu screen for switching a learned model. The CPU 101, in a case where (step S601 is YES) there is a display request from the user via the operation unit 104, controls the display control unit 115, displays a menu screen on the display unit 116, and then advances the present processing from step S601 to step S602. The CPU 101, in a case where (step S601 is NO) there is no display request from the user via the operation unit 104, continues the present processing. Note that an example of a menu screen is described later using FIG. 8A to FIG. 8C.

In step S602, the CPU 101, by controlling the communication control unit 117 and then communicating via the communication unit 118, establishes a connection with the communication apparatus 200. The CPU 101 controls the communication control unit 117 and then performs a request for list information of learned models via the communication unit 118. The CPU 101 advances the present processing to step S603.

In step S603, the CPU 101 receives the list information of learned models transmitted from the communication apparatus 200 via the communication unit 118 and then holds the acquired list information in the memory 102. Note that the list information of learned models is assumed to include learned model usage and applicable subject information, data size information present in the list information of learned models, processing performance requirement information, and such related to the image capturing apparatus 100. The CPU 101, after ending the present processing, advances the processing to step S604.

Note that processing from steps S604 to S608 described hereinafter may be omitted in a case where, when being transmitted from the communication apparatus 200, the list information of learned models is able to be processed in the image capturing apparatus 100. Also, it may be acquired that the list information of learned models is able to be processed in the image capturing apparatus 100 when receiving the list information of learned models in step S603.

From steps S604 to S607, processing is assumed to be performed in relation to each and every learned model in the list information of learned models.

In step S604, the CPU 101, from the learned model usage and applicable subject information received in step S603, determines whether or not the learned model is able to be processed in the image capturing apparatus 100. Here, the learned model being able to be processed means that a digital camera 100 supports the usage of the learned model. For example, in a case where the digital camera 100 supports a function to automatically focus on an animal subject, a learned model for detecting the animal subject is determined to be a learned model that is able to be processed. The CPU 101, in a case where (step S604 is YES) it determines that the learned model is able to be processed, advances the present processing from step S604 to step S605. The CPU 101, in a case where (step S604 is NO) it determines that the learned model is not able to be processed, advances the present processing from step S604 to step S608.

In step S605, the CPU 101, from the data size information received in step S603, determines whether each learned model is of a data size that fits (is able to be recorded by) in the available capacity reserved in the memory 102. The CPU 101, in a case where (step S605 is YES) it determines that the data size is able to fit in the available capacity, advances the present processing from step S605 to step S606. The CPU 101, in a case where (step S605 is NO) it determines that the data size is not able to fit in the available capacity, advances the present processing from step S605 to step S608.

In step S606, the CPU 101, from the processing performance requirement information received in step S603, determines whether or not the learned model can be executed in a per predetermined unit time decided by the image capturing apparatus 100. The processing performance requirement information may be set, for example, by a TOPS (Tera Operation Per Sec) value, a processing cycle count, or such that indicates the processing capability of the multiply-accumulate operation circuit. Also, the "predetermined unit time" used for determination here may be a different value in accordance with the learned model usage. For example, in a case where it is used to adjust focus on a subject when capturing, because real-time performance is sought, determination is made with reference to a relatively short unit time. On the other hand, in a case where it is used after shooting in order to search a group of images for an image in which a predetermined subject appears, a degree to which the real-time performance is sought is lower compared to when capturing. Thus, in such a case, the determination is made with reference to a relatively long unit time. The CPU 101, in a case where (step S606 is YES) it determines that the learned model is able to be executed per predetermined unit time, advances the present processing from step S606 to step S607. The CPU 101, in a case where (step S606 is NO) it determines that the learned model is not able to be executed per predetermined unit time, advances the present processing from step S606 to step S608.

In step S607, the CPU 101 determines that the learned model confirmed in steps S604 to S606 is a learned model that is able to be displayed on the menu screen and then records it in the memory 102 as a learned model list for menu-displaying. The CPU 101 advances the present processing from step S607 to step S608.

In step S608, the CPU 101 determines whether or not the processing from steps S604 to S607 was performed in relation to all the learned models described in the list information of learned models received in step S603. The CPU 101, in a case where (step S608 is YES) it determines that processing is performed in relation to all the learned models described in the list information, advances the present processing from step S608 to step S609. The CPU 101, in a case where (step S608 is NO) it determines that processing is not performed in relation to all the learned models described in the list information, returns the present processing from step S608 to step S604.

In step S609, the CPU 101 controls the display control unit 115 and then displays on the display unit 116 the learned model list for menu-displaying recorded in the memory 102. The CPU 101 advances the present processing from step S609 to step S610.

In step S610, the CPU 101 receives a selection of the learned model by a user operation from the operation unit 104, and then the CPU 101 advances the present processing from step S610 to step S611.

In step S611, the CPU 101 transmits an acquisition request for acquiring, from the communication apparatus 200 via the communication unit 118 by controlling the communication control unit 117, the learned model selected by the user in step S610. The CPU 101 advances the present processing from step S611 to step S612.

In step S612, the CPU 101 receives via the communication unit 118 and then saves in the memory 102 the learned model and related information on the learned model. The CPU 101 advances the present processing from step S612 to step S613.

In step S613, the CPU 101 configures the display screen using the related information on the learned model, controls the display control unit 115, displays on the display unit 116 that the learned model is switched, and then ends the processing in the present flowchart in step S613.

Note that in the above description, a configuration is taken so that in step S607, only the learning models that satisfy the conditions in steps S604 to S606 are stored as a model list in the memory 102 and then in step S609, are displayed on the menu screen. However, a configuration may be taken so that in step S607, all the model lists are stored in the memory 102 and learning models that do not satisfy the conditions in steps S604 to S606 are displayed in step S609 as inexecutable learning models by changing the display from that of executable learning models.

<Processing Flow of Communication Apparatus 200>

Figure 7:
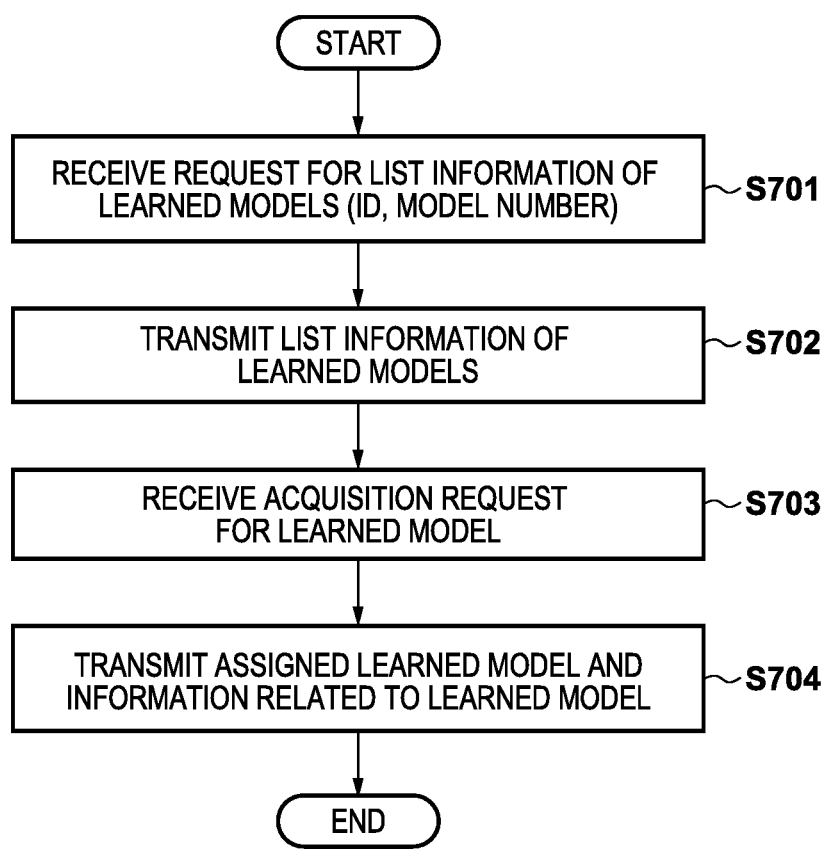
FIG. 7 is a flowchart illustrating processing of the communication apparatus in the first embodiment.

Using FIG. 7, processing sequence of the communication apparatus 200 in the present embodiment is described. This operation, in a state where the power of the communication apparatus 200 is on, is achieved by deploying in the memory 202 the computer program stored in the recording unit 206 and then by the CPU 201 reading and executing the computer program in the memory 202.

In step S701, the CPU 201 receives the learned model list information acquisition request from the image capturing apparatus 100 via the communication unit 207. Note that that the learned model list information acquisition request from the image capturing apparatus 100 is assumed to include information (ID) for identifying the image capturing apparatus 100 and image capturing device information such as a model identification number and a serial number. The CPU 201 advances the present processing from step S701 to step S702.

In step S702, the CPU 201 transmits the list information of learned models recorded in the recording unit 206 via the communication unit 207. Note that configuration may be taken so that the CPU 201 transmits, from the identification information and such of the image capturing apparatus 100 acquired in step S701, only the learned models that are able to be processed in the image capturing apparatus 100 as list information, in a case where only the learned models that are able to be processed in the image capturing apparatus 100 are transmitted as list information, the image capturing apparatus 100 is notified that it is only the list information that is able to be processed. The CPU 201 advances the present processing from step S702 to step S703.

In step S703, the CPU 201 receives the learned model acquisition request from the image capturing apparatus 100 via the communication unit 207. The CPU 201 advances the present processing from step S703 to step S704.

In step S704, the CPU 201 reads from the recording unit 206 and then transmits to the image capturing apparatus 100 via the communication unit 207 the learned model assigned from the image capturing apparatus 100 in step S703 and information related to the learned model. The CPU 201 ends the present processing in step S704.

<Example of Screens of Image Capturing Apparatus 100>

Figure 8A:
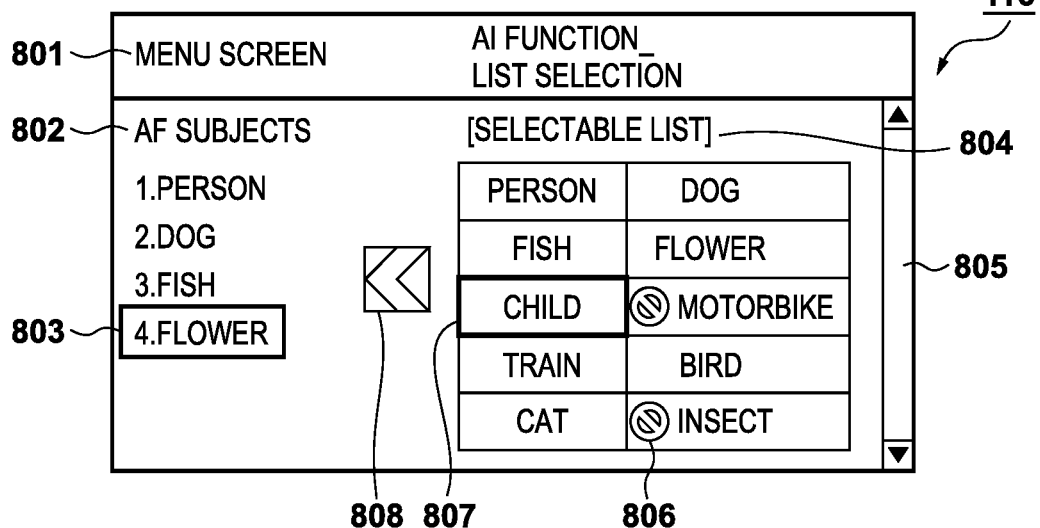
FIGS. 8A, 8B, and 8C are diagrams illustrating examples of screens of the image capturing apparatus for menu selection and for when shooting in the first embodiment.
Figure 8B:
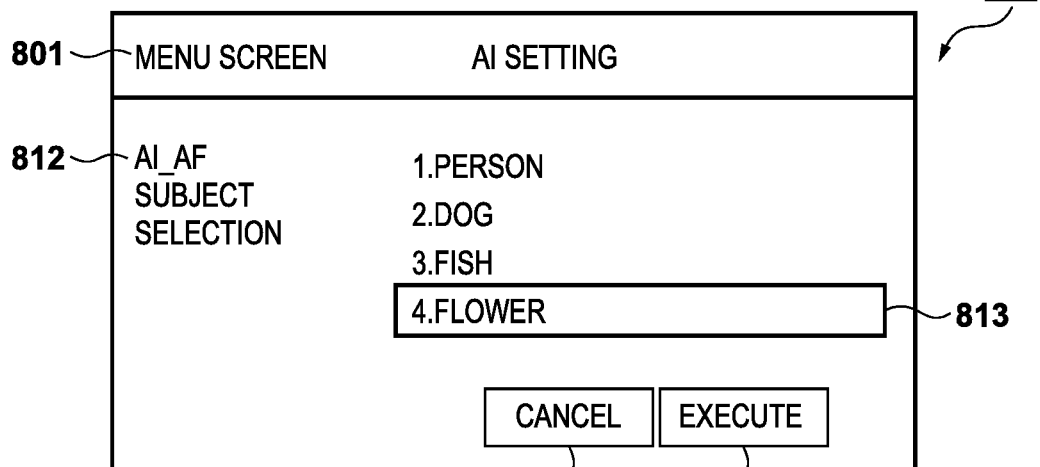
Figure 8C:
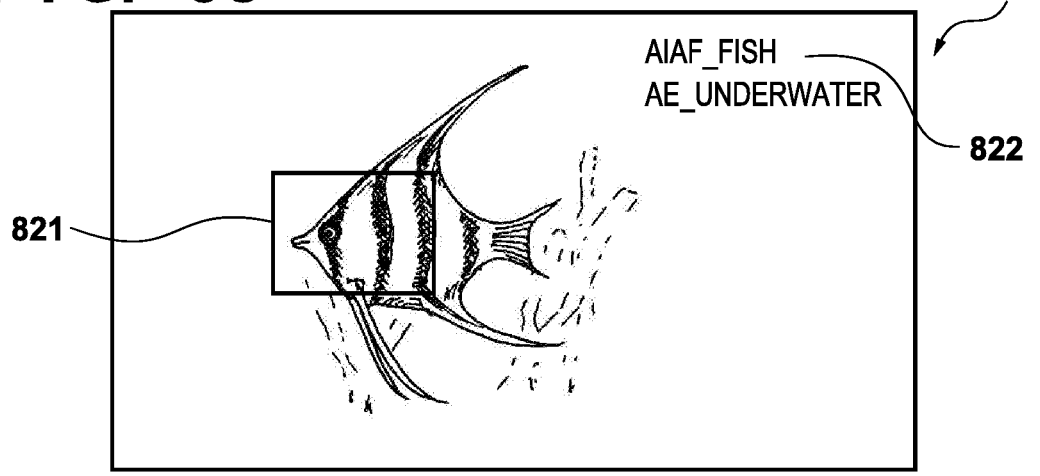

Examples of screens of the image capturing apparatus 100 in the present embodiment for menu selections and when shooting is described using FIG. 8A to FIG. 8C.

FIG. 8A illustrates an example of a screen for selecting an AF subject using a machine learning function of the image capturing apparatus 100. Note that a menu configuration may be the same for selections aside from the AF. Also, each subject is assumed to support each learned model.

A menu display 801 indicates what kind of a function is set on a screen in the menu screen.

A subject setting state 802 indicates a current setting state of the subjects that are able to be selected by the AF. The subject setting state 802 displays the subjects and numbers indicating a priority order of the subjects. The image capturing apparatus 100 detects the subjects in accordance with the priority order. Note that in regards to the numbers displayed at the subject setting state 802, they may be numbers for identifying locations for storing the subjects instead of a priority order.

A change-destination subject selection box 803 indicates a change-destination subject selected by the user. A selectable list 804 displays a list of subjects that are able to be selected. A slide bar 805 is a slide bar for displaying, by sliding, subjects that cannot be displayed on the screen. An unselectable mark 806 indicates a mark displayed in a case where although a subject is displayed as supported, the image capturing apparatus 100 cannot select it for some reason such as a setting condition.

A change-source subject selection box 807 indicates a change-source subject selected by the user. An execution button 808 is an execution button for applying a setting of a subject selected with the change-source subject selection box 807 to a portion selected with a change-destination subject selection box 803.

FIG. 8B illustrates an example of a menu screen for selecting, from the subjects set in FIG. 8A, a subject to use when shooting.

A subject selection display 812 indicates a display for selecting, from the subjects registered to the image capturing apparatus 100, a subject to use when shooting.

A shooting-phase subject selection box 813 indicates a selection box for selecting a subject to use when shooting. An execution button 814 is a button for setting the shooting-phase subject selection box 813. A cancel button 815 is a button for returning to a main screen from the present menu screen.

FIG. 8C illustrates an example of an image capturing screen of the image capturing apparatus 100 when shooting.

An AF box 821 indicates where on a subject the focus is on. A subject selection display 822 displays a setting value of the subject selected in FIG. 8B or a setting value selected on an AE selection menu (not illustrated). Note that it is not limited to AF or AE and displays a state of a function that uses a learned model.

As described above, by performing the processing of the first embodiment and by the image capturing apparatus 100 acquiring learned models from the communication apparatus 200, it becomes possible to change a plurality of learned models.

Second Embodiment

Although a second embodiment in the present invention is described in detail below with reference to the attached drawings with the image capturing apparatus 100, the communication apparatus 200, and an information processing apparatus 300 as an example, the present invention is not limited to the embodiment below.

In the first embodiment, a system configured by the image capturing apparatus 100 and the communication apparatus 200 was explained. In the present embodiment, a configuration of a system with the image capturing apparatus 100 and the communication apparatus 200 to which the information processing apparatus 300 such as a smartphone or a PC is added is described. Note that the block configuration of the image capturing apparatus 100 and the block configuration of the communication apparatus 200 in the present embodiment are the same as that of the first embodiment.

<System Configuration of Second Embodiment>

Figure 9:
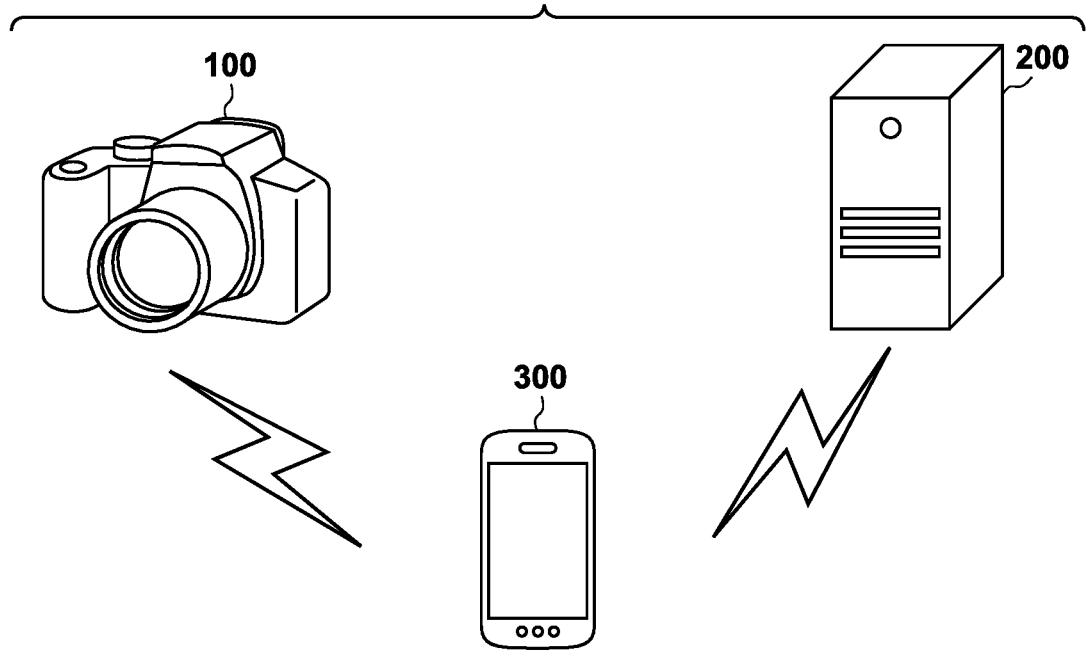
FIG. 9 is a system configuration diagram of a second embodiment.

Using FIG. 9, a system configuration of the present embodiment is described. As illustrated in FIG. 9, the image capturing apparatus 100, the communication apparatus 200, and the information processing apparatus 300 are connected to each other by a wireless or wired communication network. Note that the image capturing apparatus 100 and the communication apparatus 200 may perform communication via the information processing apparatus 300.

<Block Configuration of Information Processing Apparatus 300>

Figure 10:
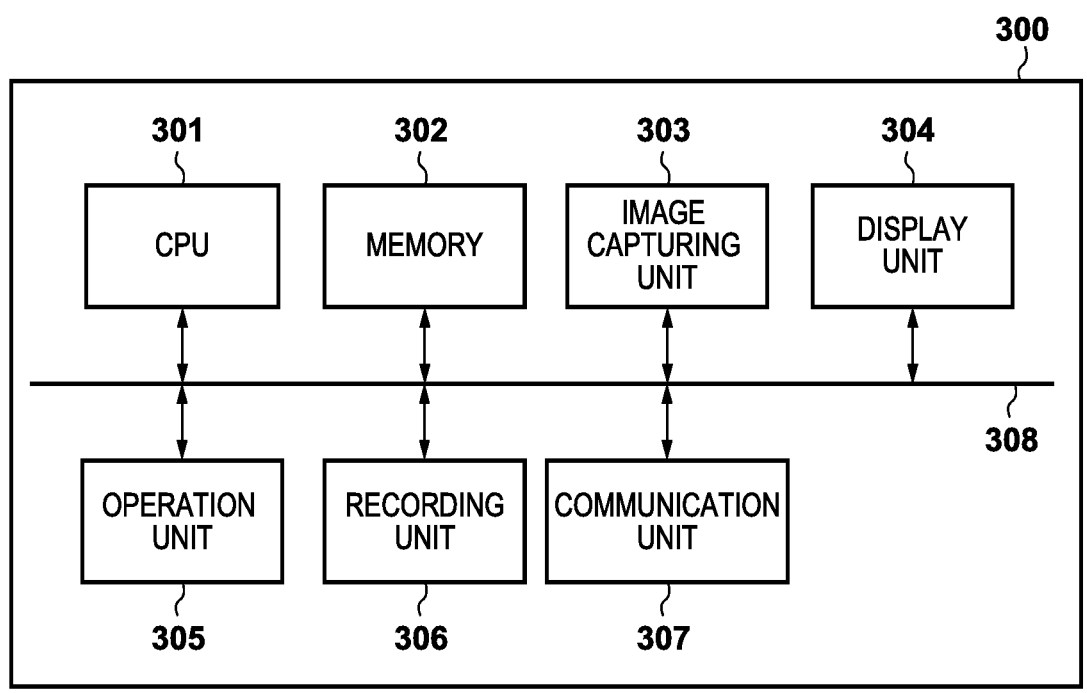
FIG. 10 is a block diagram of an information processing apparatus in the second embodiment.

FIG. 10 is a block diagram illustrating a configuration of the information processing apparatus 300 in the second embodiment. The information processing apparatus 300 comprises a CPU 301, a memory 302, an image capturing unit 303, a display unit 304, an operation unit 305, a recording unit 306, and a communication unit 307.

The CPU 301 performs control of all processing blocks configuring the information processing apparatus 300. A program is stored in the recording unit 306 described later.

The memory 302 is used mainly as a work area for the CPU 301 and a temporary buffer area for data. Programs such as an OS (Operation System) and an application are deployed on the memory 302 and then are executed by the CPU 301.

The image capturing unit 303 comprises an optical lens, a CMOS sensor, a digital image processing unit, and such. Then light inputted via the optical lens is photoelectrically converted by the CMOS sensor, an analog signal from the CMOS sensor is converted to digital data, and then a shooting image is acquired. A shooting image acquired by the image capturing unit 303 is temporarily stored in the memory 302 and then is processed based on control of the CPU 301. For example, a recording by the recording unit 306 to the recording medium, a transmission by the communication unit 307 to an external device, and such are performed. Also, the image capturing unit 303 comprises a lens control unit and performs control such as zoom, focus, and aperture adjustment based on an instruction from the CPU 301.

The display unit 304 is configured by a liquid crystal panel, an organic EL panel, or such and performs display of an operation screen, a shooting image, and such based on an instruction from the CPU 301.

The operation unit 305 is configured by a keyboard, a mouse, a button, a four-way directional key, a touch panel, a remote controller, and such and receives an operation instruction from the user. Operation information inputted from the operation unit 305 is transmitted to the CPU 301, and the CPU 301 executes control of each processing block based on the operation information.

The recording unit 306 is configured by a high-capacity recording medium and is a processing block for storing and reading various data based on an instruction from the CPU 301. The recording medium is configured, for example, a built-in flash memory, a built-in hard disk, a memory card that is able to attach/detach, or such.

The communication unit 307 comprises processing hardware such as an antenna, a wireless LAN, and a wired LAN for performing communication and is a processing block for performing, for example, IEEE 802.11n/a/g/b method communication. The communication unit 307 connects to an external access point by the wireless LAN and then performs communication with other wireless communication devices through the access point.

An internal bus 308 connects each processing block in the information processing apparatus 300 to each other.

<Processing Sequence of Second Embodiment>

Figure 11:
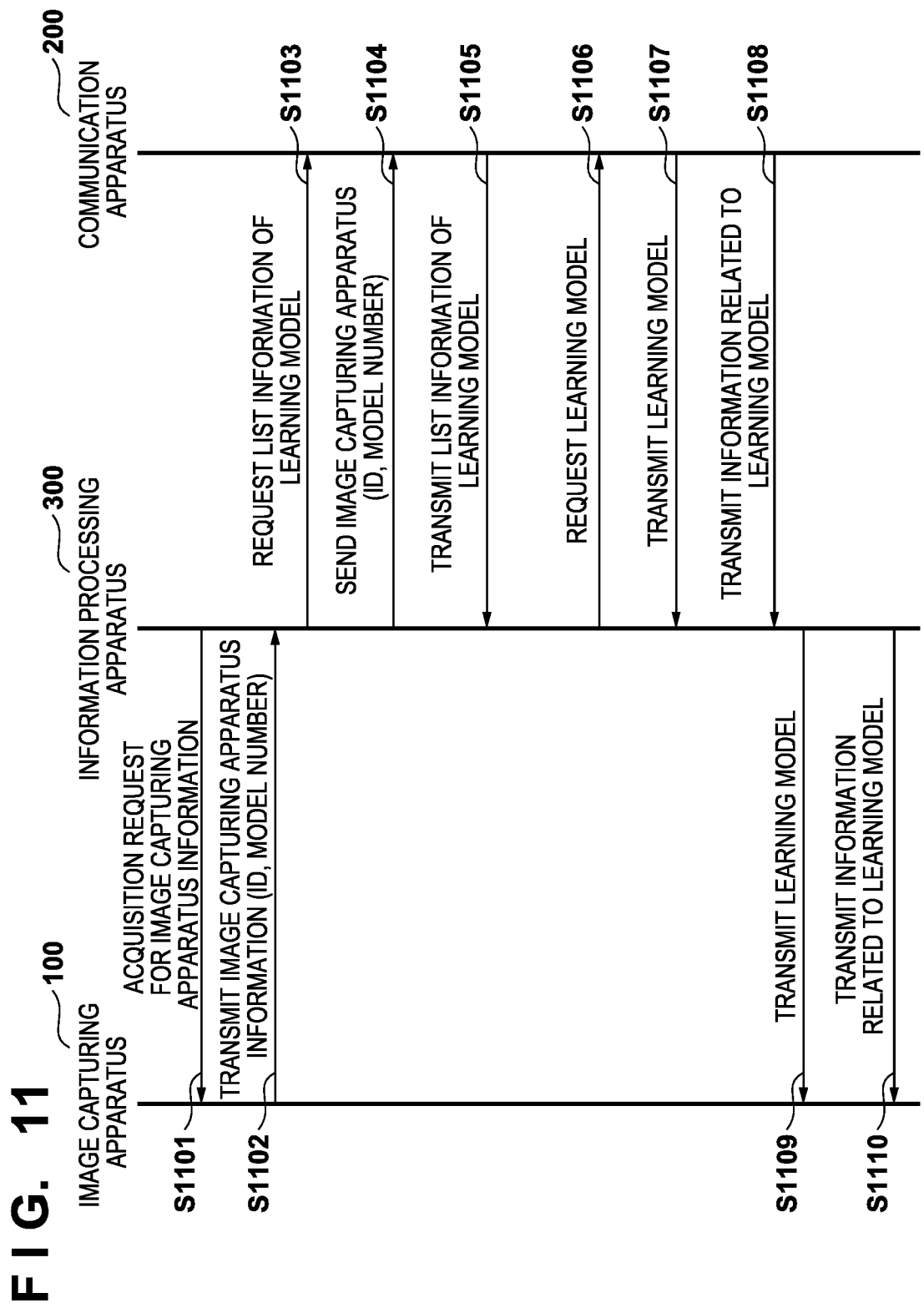
FIG. 11 is a processing sequence diagram of the image capturing apparatus, the communication apparatus, and the information processing apparatus in the second embodiment.

FIG. 11 is a diagram for illustrating a processing sequence of the image capturing apparatus 100, the communication apparatus 200, and the information processing apparatus 300 in the present embodiment.

In step S1101, the information processing apparatus 300 performs an acquisition request in relation to the image capturing apparatus 100 for information (ID) for identifying the image capturing apparatus 100 or image capturing device information such as a model identification number and a serial number. Also, the image capturing device information is assumed to include learned model usage and applicable subject information, available capacity reserved in the memory 102, and processing performance requirement information.

In step S1102, the image capturing apparatus 100 transmits the image capturing device information in relation to the information processing apparatus 300.

In step S1103, the information processing apparatus 300 transmits an acquisition request for list information of learned models in relation to the communication apparatus 200.

In step S1104, the information processing apparatus 300 transmits the image capturing device information acquired in step S1102 in relation to the communication apparatus 200.

In step S1105, the communication apparatus 200 receives from the information processing apparatus 300 the request for acquiring list information of learned models and then replies with list information of learned models. Note that in this step, configuration may be taken so that only list information of learned models configured by learned models that are able to be processed by the image capturing apparatus 100 is transmitted, and configuration may be taken so that list information of all learned models held by the communication apparatus 200 is transmitted.

In step S1106, the information processing apparatus 300 selects a necessary learned model from the list information of learned models acquired in step S1105 and then transmits an acquisition request for the learned model in relation to the communication apparatus 200.

In step S1107, the communication apparatus 200 receives the acquisition request for a learned model from the information processing apparatus 300 and then replies with the requested learned model.

In step S1108, the communication apparatus 200 transmits text, image information, and such necessary for a learned model menu display as information related to the learned model transmitted in step S1107.

In step S1109, the information processing apparatus 300 transmits the learned model acquired in step S1107 in relation to the image capturing apparatus 100.

In step S1110, the information processing apparatus 300 transmits information related to the learned model acquired in step S1108 in relation to the image capturing apparatus 100.

<Processing Flow of Image Capturing Apparatus 100>

Figure 12:
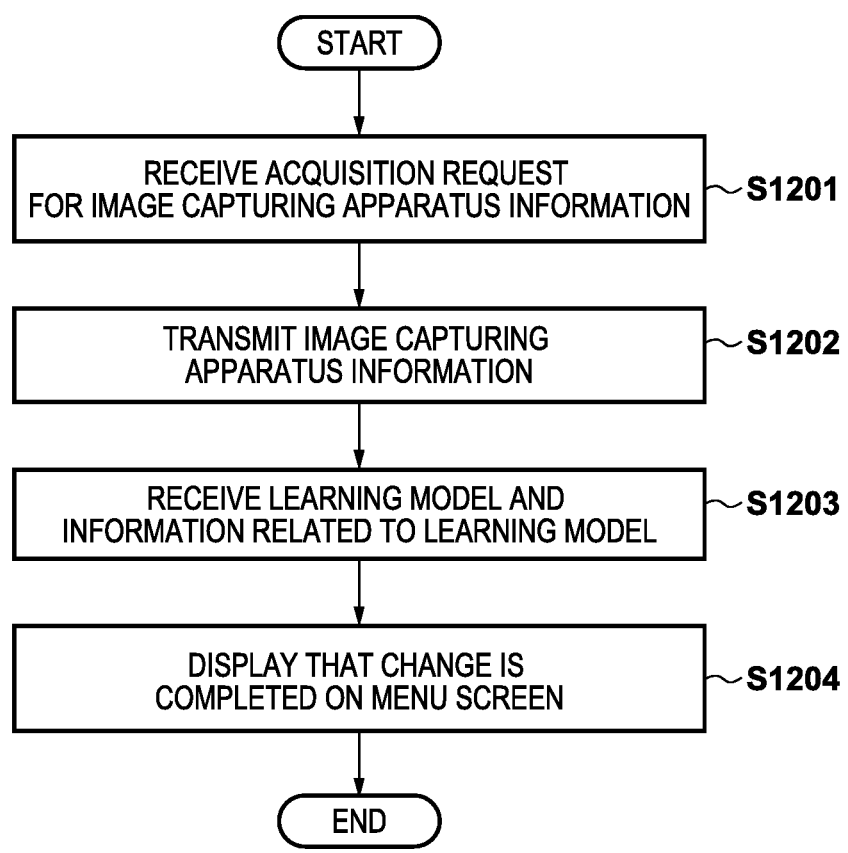
FIG. 12 is a flowchart illustrating processing of the image capturing apparatus in the second embodiment.

FIG. 12 is a flowchart illustrating processing of the image capturing apparatus 100 in the present embodiment. This operation, in a state where the power of the image capturing apparatus 100 is on, is achieved by deploying in the memory 102 the computer program stored in the non-volatile memory 103 and then by the CPU 101 reading and executing the computer program in the memory 102.

In step S1201, the CPU 101, by controlling the communication control unit 117 and then communicating via the communication unit 118, establishes a connection with the information processing apparatus 300. Note that it also performs a connection the communication apparatus 200 in a case where it communicates directly with the communication apparatus 200. The CPU 101 receives an acquisition request for image capturing device information from the information processing apparatus 300 via the communication unit 118 and then advances the present processing from step S1201 to step S1202.

In step S1202, the CPU 101 controls the communication control unit 117 and then transmits the image capturing device information stored in the memory 102 to the information processing apparatus 300 via the communication unit 118. The CPU 101 advances the present processing from step S1202 to step S1203.

In step S1203, the CPU 101 receives the learned models transmitted from the information processing apparatus 300 via the communication unit 118 and then stores the acquired teaming model and information related to the learning model in the memory 102. The CPU 101 advances the present processing from step S1203 to step S1204.

In step S1204, the CPU 101 configures the display screen using the related information on the learned model, controls the display control unit 115, displays on the display unit 116 that the learned model is switched, and then ends the processing in the present flowchart in step S1204.

Note that although a flow in which the CPU 101 acquires the learning model from the information processing apparatus 300 was described in FIG. 12, an access destination to the communication apparatus 200 may be acquired from the information processing apparatus 300 and then the learning model and the information related to the learning model may be acquired directly from the communication apparatus 200.

Processing Flow of Information Processing Apparatus 300>

Figure 13:
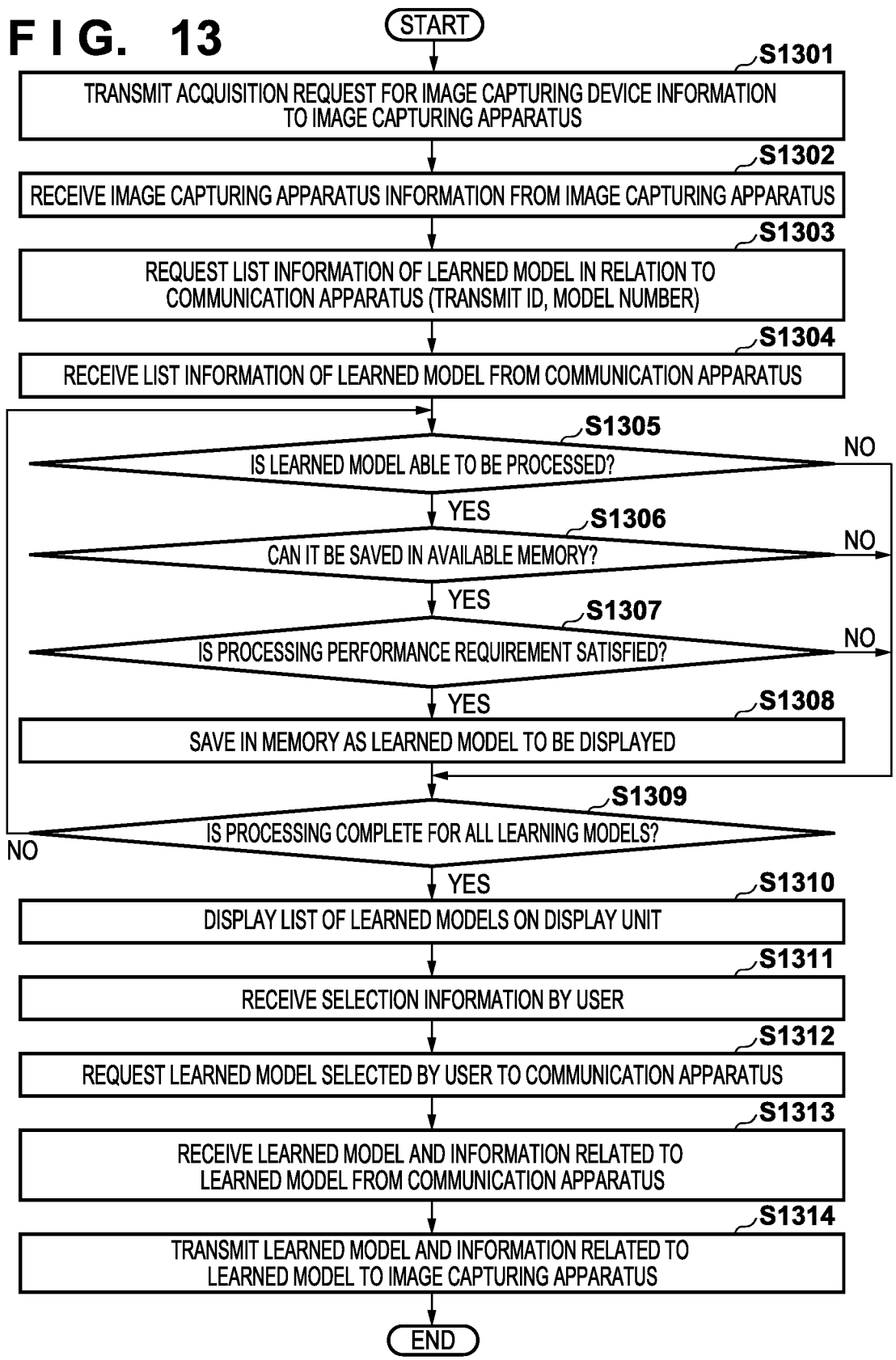
FIG. 13 is a flowchart illustrating processing of the information processing apparatus in the second embodiment.

FIG. 13 is a flowchart illustrating processing of the information processing apparatus 300 in the present embodiment. This operation, in a state where the power of the information processing apparatus 300 is on, is achieved by deploying in the memory 302 the computer program stored in the recording unit 306 and then by the CPU 301 reading and executing the computer program in the memory 302.

In step S1301, the CPU 301 establishes a connection with the image capturing apparatus 100 and then transmits the acquisition request for image capturing device information via the communication unit 307 in relation to the image capturing apparatus 100. The CPU 301 advances the present processing to step S1302.

In step S1302, the CPU 301 acquires the image capturing device information front the image capturing apparatus 100 via the communication unit 307. The CPU 301 advances the present processing to step S1303.

In step S1303, the CPU 301 establishes a connection with the communication apparatus 200 and then performs the request for the list information of learned models in relation to the communication apparatus 200. Note that the CPU 301 is assumed to transmit the image capturing device information acquired in step S1302 to the communication apparatus 200 in addition to the request for the list information of learned models. The CPU 301 advances the present processing to step S1304.

In step S1304, the CPU 301 receives the list information of learned models transmitted from the communication apparatus 200 via the communication unit 307 and then holds the acquired list information in the memory 302. Note that the list information of learned models is assumed to include learned model usage and applicable subject information, data size information present in the list information of learned models, and processing performance requirement information related to the image capturing apparatus 100. The CPU 101, after ending the present processing, advances the processing to step S1305.

Note that processing from steps S1304 to S1309 described hereinafter may be omitted in a case where, when being transmitted from the communication apparatus 200, the list information of learned models is able to be processed in the image capturing apparatus 100. Also, it may be acquired that the list information of learned models is able to be processed in the image capturing apparatus 100 when receiving the list information of learned models. From steps S1305 to S1308, processing is assumed to be performed in relation to each and every learned model in the list information of learned models.

In step S1305, the CPU 301 determines, from the image capturing apparatus information received from the image capturing apparatus 100 in step S1302 and the learned model usage and applicable subject information received from the communication apparatus 200 in step S1304, whether or not the learned model is able to be processed in the image capturing apparatus 100. The CPU 301, in a case where (step S1305 is YES) it determines that the learned model is able to be processed, advances the present processing from step S1305 to step S1306. The CPU 301, in a case where (step S1305 is NO) it determines that the learned model is not able to be processed, advances the present processing from step S1305 to step S1309.

In step S1306, the CPU 301 determines, from the available capacity of the memory 102 acquired in step S1302 and the data size of the learned model received in step S1304, whether the data size fits in the available capacity of the memory 102. The CPU 101, in a case where (step S1306 is YES) it determines that the data size is able to fit in the available capacity, advances the present processing from step S1306 to step S1307. The CPU 301, in a case where (step S1306 is NO) it determines that the data size is not able to fit in the available capacity, advances the present processing from step S1306 to step 1309.

In step S1307, the CPU 301 determines, from the image capturing apparatus information received from the image capturing apparatus 100 in step S1302 and processing performance requirement information received from the communication apparatus 200 in step S1304, whether or not the learned model is able to be executed per predetermined unit time decided by the image capturing apparatus 100. The processing performance requirement information is the same as that described in step S606 of the first embodiment. The CPU 301, in a case where (step S1307 is YES) it determines that the learned model is able to be executed per predetermined unit time, advances the present processing from step S1307 to step S1308. The CPU 301, in a case where (step S1307 is NO) it determines that the learned model is not able to be executed per predetermined unit time, advances the present processing from step S1307 to step S1309.

In step S1308, the CPU 301 determines that the learned model confirmed in steps S1305 to S1307 is a learned model that is able to be presented to the user and then records it in the memory 302 as a learned model list to be presented to the user. The CPU 301 advances the present processing from step S1308 to step S1309.

In step S1309, the CPU 301 determines whether or not the processing from steps S1305 to S1308 was performed in relation to all the learned models described in the list information of learned models received in step S1304. The CPU 301, in a case where (step S1309 is YES) it determines that processing is performed in relation to all the learned models described in the list information, advances the present processing from step S1309 to step S1310. The CPU 301, in a case where (step S1309 is NO) it determines that processing is not performed in relation to all the learned models described in the list information, returns the present processing from step S1309 to step S1305.

In step S1310, the CPU 301 displays on the display unit 304 the learned model list to be presented to the user recorded in the memory 302. The CPU 301 advances the present processing from step S1310 to step S1311. Note that an example of a display method for displaying on the display unit 304 is described later using FIG. 15.

In step S1311, the CPU 301 receives a selection of the learned model by a user operation from the operation unit 305 and then advances the present processing from step S1311 to step S1312.

In step S1312, the CPU 301 transmits an acquisition request regarding the learned model selected by the user in step S1311 in relation to the communication apparatus 200 via the communication unit 307. The CPU 301 advances the present processing from step S1312 to step S1313.

In step S1313, the CPU 301 receives via the communication unit 307 and then saves in the memory 302 the learned model and related information on the learned model. The CPU 301 advances the present processing from step S1313 to step S1314.

In step S1314, the CPU 301 transmits in relation to the image capturing apparatus 100 the learned model and related information on the learned model via the communication unit 307. The CPU 301 ends the present processing in step S1314. Note that the CPU 301 transmits, as related information of the learned model, information related to the priority order of the learned models supporting the subjects selected by priority numbers 1505 described later in FIG. 15.

Note that although a flow in which the CPU 301 acquires from the communication apparatus 200 and then transfers a learning model in relation to the image capturing apparatus 100 was described in FIG. 13, an access destination to the communication apparatus 200 may be notified from the information processing apparatus 300 to the image capturing apparatus 100.

<Processing Flow of Communication Apparatus 200>

Figure 14:
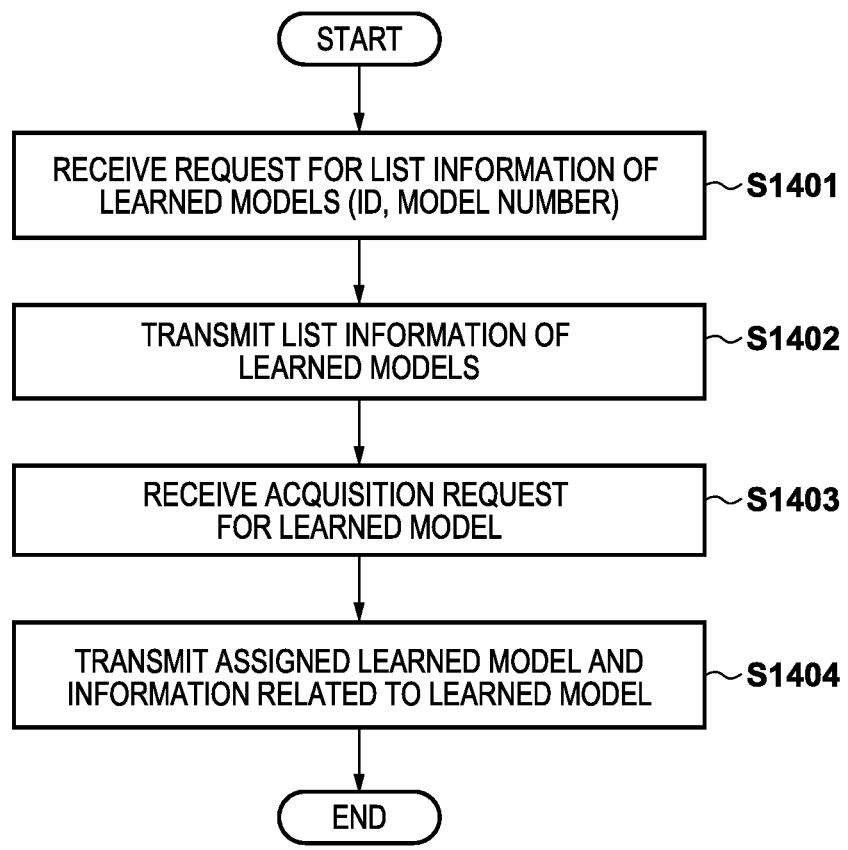
FIG. 14 is a flowchart illustrating processing of the communication apparatus in the second embodiment.

FIG. 14 is a flowchart illustrating processing of the communication apparatus 200 in the present embodiment. This operation, in a state where the power of the communication apparatus 200 is on, is achieved by deploying in the memory 202 the computer program stored in the recording unit 206 and then by the CPU 201 reading and executing the computer program in the memory 202.

In step S1401, the CPU 201 receives the learned model list information acquisition request from the information processing apparatus 300 via the communication unit 207. Note that that the learned model list information acquisition request from the information processing apparatus 300 is assumed to include information (ID) for identifying the image capturing apparatus 100 and image capturing device information such as a model identification number and a serial number. The CPU 201 advances the present processing from step S1401 to step S1402.

In step S1402, the CPU 201 transmits to the information processing apparatus 300 via the communication unit 207 the list information of learned models recorded in the recording unit 206. Note that configuration may be taken so that the CPU 201 transmits, from the identification information and such of the image capturing apparatus 100 acquired in step S1401, only the learned models that are able to be processed in the image capturing apparatus 100 as list information. In a case where only the learned models that are able to be processed in the image capturing apparatus 100 are transmitted as list information, the information processing apparatus 300 is notified that it is only the list information that is able to be processed. The CPU 201 advances the present processing from step S1402 to step S1403.

In step S1403, the CPU 201 receives the learned model acquisition request from the information processing apparatus 300 via the communication unit 207. The CPU 201 advances the present processing from step S1403 to step S1404.

In step S1404, the CPU 201 reads from the recording unit 206 and then transmits to the information processing apparatus 300 via the communication unit 207 the learned model assigned from the information processing apparatus 300 in step S1403 and information related to the learned model. The CPU 201 ends the present processing in step S1404.

Figure 15:
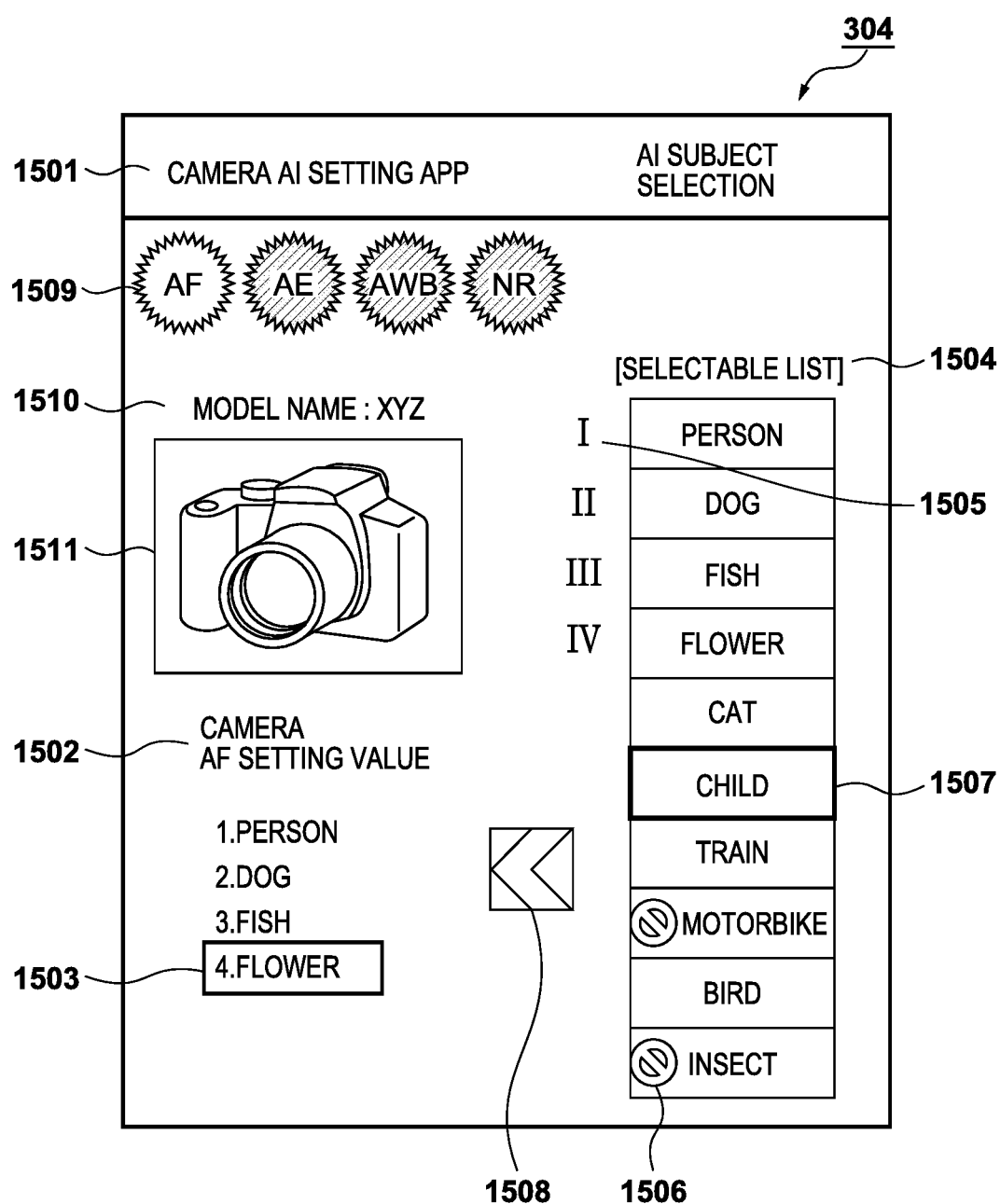

An example of a subject selection screen for performing processing using the learned model that operates on an application of the information processing apparatus 300 in the present embodiment is illustrated in FIG. 15. A screen is a screen of the application and is assumed to be displayed on the display unit 304 of the information processing apparatus 300.

An application title 1501 is a display for identifying the application. The subject setting state 1502 indicates a current setting state of the subjects that are able to be selected by the image capturing apparatus 100 in the AF. Note that numbers of the subject setting state 1502 indicate priority numbers of subjects set in the image capturing apparatus 100. A change-destination subject selection box 1503 indicates a change-destination subject selected by the user.

A selectable list 1504 displays a list of subjects that are able to be selected. The selectable list prioritizes and displays subjects already held in the image capturing apparatus 100 at a high level. The priority number 1505 indicates a priority number of a subject in the selectable list 1504 set for the image capturing apparatus 100. By selecting the change-destination subject selection box 1503 and a change-source subject selection box 1507, the display of the priority number 1505 changes.

An unselectable mark 1506 indicates a mark displayed in a case where although a subject is displayed as supported, the image capturing apparatus 100 cannot select it for some reason such as a setting condition. The change-source subject selection box 1507 indicates a change-source subject selected by the user. An execution button 1508 is an execution button for applying a setting of a subject selected with the change-source subject selection box 1507 to a portion selected with change-destination subject selection box 1503.

Function selection buttons 1509 are buttons for switching a function among functions such as AF, AE, AWB, and noise reduction (NR) that use the learned model. A model name 1510 displays identification information such as a model name of the image capturing apparatus 100. An icon 1511 displays an icon that makes it possible to determine the image capturing apparatus 100.

As described above, by performing processing of the present embodiment and by the image capturing apparatus 100 acquiring learned models from the communication apparatus 200 via the information processing apparatus 300, it becomes possible to change a plurality of learned models.

Third Embodiment

Although a third embodiment in the present invention is described in detail below with reference to the attached drawings with the image capturing apparatus 100, the communication apparatus 200, and the information processing apparatus 300 as an example, the present invention is not limited to the embodiment below.

In the first embodiment and the second embodiment, the learned model was configured effectively in relation to one subject. In the present embodiment, a case where one learning model is effective for a plurality of subjects is described.

Note that the system configurations of the image capturing apparatus 100, the communication apparatus 200, and the information processing apparatus 300 are the same as the system configured in the second embodiment and each block configuration and processing flow are also the same as that of the second embodiment.

An example of a presentation method of a learning model in the present embodiment is described using FIG. 16.

The selectable list 1504 on the application screen of the information processing apparatus 300 described above in FIG. 15 is displayed as a list including a multiple-subject-supporting learned model 1601. The user selects a desired subject from among the selectable list 1504 including the multiple-subject-supporting learned model 1601 and then registers the subject to the image capturing apparatus 100. Note that in a case where "dog+cat", the "dog" is prioritized, and in a case where "cat+dog", the "cat" is prioritized. Similarly, if "adult+child", the "adult" is prioritized and if "child+adult", the "child" is prioritized, and the same applies to "train+car".

Note that although the selectable list 1504 on the application screen of the information processing apparatus 300 was described as an example, this may be performed on the menu screen of the image capturing apparatus 100.

Figure 17:
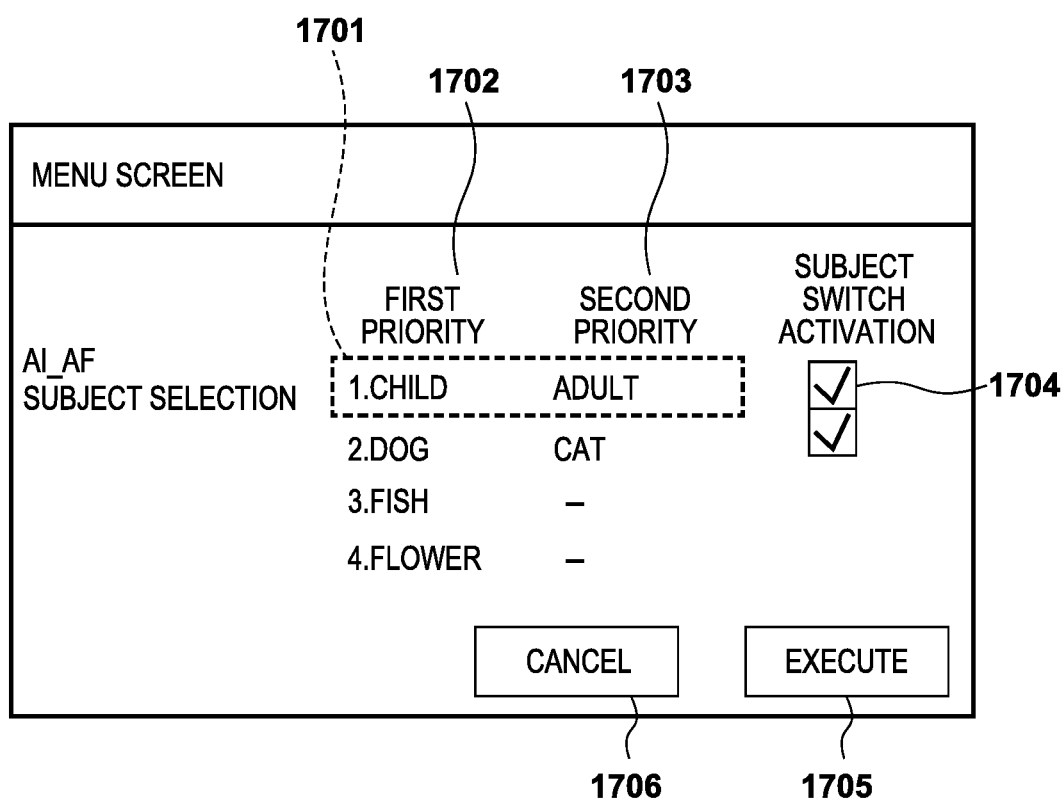
FIG. 17 is a diagram illustrating an example of a menu selection screen of the image capturing apparatus in the third embodiment.

In FIG. 17, is an example of a menu selection screen of the image capturing apparatus in the present embodiment is illustrated. An example of a menu screen for selecting, in a case where a learning model including a plurality of subjects is selected as described above in FIG. 16, a subject to use when shooting is illustrated in FIG. 17.

A shooting-phase subject selection box 1701 indicates a selection box for selecting a subject to use when shooting. A first priority subject 1702 presents a subject of the highest priority among a plurality of subjects. A second priority subject 1703 presents a subject of the second highest priority among a plurality of subjects. In AF processing, in a case where a first priority subject is not found, processing for detecting a second priority subject is performed.

A subject switch activation button 1704 is a setting button for setting, even if the learning model supports a plurality of subjects, in a case where processing for detecting only the first priority subject is performed. In a case where the subject switch activation button 1704 is not activated, processing for detecting only the first priority subject 1702 is performed.

An execution button 1705 is a button for finalizing a state set by the user. A cancel button 1706 is a button for returning to a main screen from the present menu screen.

Note that the present embodiment takes a form in which the multiple-subject-supporting learned model is presented to the user in units of learned models as indicated in 1601. However, even if the learned model supports a plurality of subjects as illustrated in 1602 in FIG. 16, it may be presented to and is able to be selected by the user in a unit of a subject.

Also, although only up to two subjects were described as the plurality of subjects in the present embodiment, there may be three or more subjects.

As described above, by performing processing of the present embodiment and by the image capturing apparatus 100 acquiring a learned model, even if the learned model supports a plurality of subjects, it becomes possible to change a plurality of learned models.

Variations

While embodiments in the present invention were described in detail in the above, the present invention is not limited to these embodiments, and various forms of a scope that does not deviate from the spirit of the invention are included in the present invention.

A target to which the present invention is to be applied is not limited to the image capturing apparatus 100 and such in the embodiments described above. A similar function as the embodiments described above can be achieved even if in a case where the image capturing apparatus 100 is a system configured by a plurality of apparatuses, for example. Furthermore, it is possible to carry out and achieve a part of the processing of the image capturing apparatus 100 with an external device on a network.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-200225, filed Nov. 1, 2019 which is hereby incorporated by reference herein in its entirety.

What is claimed is:

1. An image capturing apparatus, comprising:
at least one processor or circuit configured to function as:
a reception unit configured to connect with an external device which is able to transmit a plurality of learned models and receive list information of a plurality of learned models;
a selection unit configured to select, based on the list information of the plurality of learned models, a learned model from the plurality of learned models; and
a transmission unit configured to transmit to the external device a transmission request for the learned model selected by the selection unit,
wherein, the reception unit receives the selected learned model transmitted from the external device,
wherein the at least one processor or circuit is configured to further function as a determination unit configured to determine whether or not each of the plurality of learned models is a learned model that is able to be processed by the image capturing apparatus.

2. The image capturing apparatus according to claim 1, further comprising: a presentation device configured to present the list information of the plurality of learned models.

3. The image capturing apparatus according to claim 2, wherein the selection unit selects a learned model selected by a user from the plurality of learned models presented by the presentation device.

4. The image capturing apparatus according to claim 1, wherein the presentation device presents the learned model determined by the determination unit to be able to be processed by the image capturing apparatus.

5. The image capturing apparatus according to claim 1, wherein the presentation device causes to be different, among the plurality of learned models, a presentation of the learned model determined by the determination unit to be able to be processed by the image capturing apparatus and a presentation of a learned model determined by the determination unit to not be able to be processed by the image capturing apparatus.

6. The image capturing apparatus according to claim 1, wherein the determination unit determines whether or not a configuration of a neural network of the learned model is able to be processed by the image capturing apparatus.

7. The image capturing apparatus according to claim 1, wherein the determination unit determines whether or not a data size of the learned model is a size that is able to be recorded in an available capacity of a memory of the image capturing apparatus.

8. The image capturing apparatus according to claim 1, wherein the determination unit determines whether or not the learned model is able to be processed per predetermined unit time by the image capturing apparatus.

9. The image capturing apparatus according to claim 2, wherein the learned model is used in order to perform processing of any of detection processing, classification processing, region classification processing, image restoration processing, focus processing, exposure processing, and white balance processing.

10. The image capturing apparatus according to claim 2, wherein the learned model is able to be applied to a plurality of subjects.

11. The image capturing apparatus according to claim 10, wherein the presentation device presents so as to make a priority order among the plurality of subjects discernable.

12. The image capturing apparatus according to claim 1, wherein the learned model is data that includes either a weighting coefficient or bias information.

13. The image capturing apparatus according to claim 1, wherein the learned model is data that includes neural network configuration information.

14. An information processing apparatus, comprising:
at least one processor or circuit configured to function as:
a reception unit configured to connect with an external device which is able to transmit a plurality of learned models and receive list information of a plurality of learned models;
a determination unit configured to determine whether or not each of the plurality of learned models is a learned model that is able to be processed by an image capturing apparatus;
a selection unit configured to select, based on the list information of the plurality of learned models, a learned model from the plurality of learned models; and
a transmission unit configured to transmit to the external device a transmission request for the learned model selected by the selection unit,
wherein the reception unit receives the selected learned model transmitted from the external device, and the transmission unit transmits the selected learned model to the image capturing apparatus.

15. The information processing apparatus according to claim 14, further comprising a presentation device configured to present the list information of the plurality of learned models.

16. The information processing apparatus according to claim 15, wherein the selection unit selects a learned model selected by a user from the plurality of learned models presented by the presentation device.

17. The information processing apparatus according to claim 14, wherein the determination unit acquires information from the image capturing apparatus on whether or not each of the plurality of learned models is a learned model that is able to be processed by the image capturing apparatus.

18. The information processing apparatus according to claim 14, wherein the determination unit acquires information from the external device on whether or not each of the plurality of learned models is a learned model that is able to be processed by the image capturing apparatus.

19. The information processing apparatus according to claim 14, wherein the determination unit acquires information from the image capturing apparatus on whether or not each of the plurality of learned models is a learned model that is saved in the image capturing apparatus, and the presentation device presents at a high level the learned models saved in the image capturing apparatus.

20. The information processing apparatus according to claim 14, wherein the presentation device causes to be different, among the plurality of learned models, a presentation of the learned model determined by the determination unit to be able to be processed by the image capturing apparatus and a presentation of a learned model determined by the determination unit to not be able to be processed by the image capturing apparatus.

21. An image capturing apparatus system comprising:
an external device configured to be able to transmit a plurality of learned models; and
an image capturing apparatus including at least one processor or circuit configured to function as a reception unit configured to connect with the external device and receive list information of a plurality of learned models, a determination unit configured to determine whether or not each of the plurality of learned models is a learned model that is able to be processed by the image capturing apparatus, a selection unit configured to select, based on the list information of the plurality of learned models, a learned model from the plurality of learned models, and a transmission unit configured to transmit a transmission request for the learned model selected by the selection unit to the external device,
wherein, the reception unit receives the selected learned model transmitted from the external device.

22. An image capturing apparatus system comprising:
an external device configured to be able to transmit a plurality of learned models;
an information processing apparatus including at least one processor or circuit configured to function as a reception unit configured to connect with the external device and receive list information of a plurality of learned models, a determination unit configured to determine whether or not each of the plurality of learned models is a learned model that is able to be processed by an image capturing apparatus, a selection unit configured to select, based on the list information of the plurality of learned models, a learned model from the plurality of learned models, and a transmission unit configured to transmit a transmission request for the learned model selected by the selection unit to the external device; and
the image capturing apparatus,
wherein the reception unit receives the selected learned model transmitted from the external device, and the transmission unit transmits the selected learned model to the image capturing apparatus.

23. A method of controlling an image capturing apparatus comprising:
connecting with an external device, which is able to transmit a plurality of learned models, and receiving list information of a plurality of learned models;
determining whether or not each of the plurality of learned models is a learned model that is able to be processed by the image capturing apparatus,
selecting, based on the list information of the plurality of learned models, a learned model from the plurality of learned models; and
transmitting to the external device a transmission request for the learned model selected in the selection,
wherein, in the reception, the selected learned model transmitted from the external device is received.

24. A method of controlling an information processing apparatus comprising:
connecting with an external device, which is able to transmit a plurality of learned models, and receiving list information of a plurality of learned models;
determining whether or not each of the plurality of learned models is a learned model that is able to be processed by an image capturing apparatus,
selecting, based on the list information of the plurality of learned models, a learned model from the plurality of learned models; and
transmitting to the external device a transmission request for the learned model selected in the selection,
wherein in the reception, the selected learned model transmitted from the external device is received, and in the transmission, the selected learned model is transmitted to the image capturing apparatus.

25. A non-transitory computer readable storage medium storing a program for causing a computer to execute the steps of a method of controlling an image capturing apparatus, the method comprising:
connecting with an external device, which is able to transmit a plurality of learned models, and receiving list information of a plurality of learned models;
determining whether or not each of the plurality of learned models is a learned model that is able to be processed by the image capturing apparatus,
selecting, based on the list information of the plurality of learned models, a learned model from the plurality of learned models; and
transmitting to the external device a transmission request for the learned model selected in the selection,
wherein, in the reception, the selected learned model transmitted from the external device is received.

26. A non-transitory computer readable storage medium storing a program for causing a computer to execute the steps of a method of controlling an information processing apparatus, the method comprising:
connecting with an external device, which is able to transmit a plurality of learned models, and receiving list information of a plurality of learned models;
determining whether or not each of the plurality of learned models is a learned model that is able to be processed by an image capturing apparatus,
selecting, based on the list information of the plurality of learned models, a learned model from the plurality of learned models; and
transmitting to the external device a transmission request for the learned model selected in the selection,
wherein in the reception, the selected learned model transmitted from the external device is received, and in the transmission, the selected learned model is transmitted to the image capturing apparatus.

* * * * *